(12) United States Patent
Steinthorsson et al.

(10) Patent No.: US 12,442,597 B2
(45) Date of Patent: Oct. 14, 2025

(54) HEAT EXCHANGER WITH PROGRESSIVE DIVIDED FLOW CIRCUIT, STRUCTURAL LOAD BEARING DESIGN

(71) Applicant: Parker-Hannifin Corporation, Cleveland, OH (US)

(72) Inventors: Erlendur Steinthorsson, Pepper Pike, OH (US); Andrew M. Odar, Chardon, OH (US); Raman Ras, Concord Township, OH (US); Peter Ditzel, Concord, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 93 days.

(21) Appl. No.: 18/255,714

(22) PCT Filed: Jan. 20, 2022

(86) PCT No.: PCT/US2022/013048
§ 371 (c)(1),
(2) Date: Jun. 2, 2023

(87) PCT Pub. No.: WO2022/197359
PCT Pub. Date: Sep. 22, 2022

(65) Prior Publication Data
US 2023/0417489 A1 Dec. 28, 2023

Related U.S. Application Data

(60) Provisional application No. 63/288,170, filed on Dec. 10, 2021, provisional application No. 63/140,303, (Continued)

(51) Int. Cl.
*F01D 5/18* (2006.01)
*F28D 1/03* (2006.01)
(Continued)

(52) U.S. Cl.
CPC ........... *F28D 1/0308* (2013.01); *F28D 21/00* (2013.01); *F28F 3/048* (2013.01); *F28D 2021/0021* (2013.01); *F28F 2215/04* (2013.01)

(58) Field of Classification Search
CPC ...... F01D 5/185; F01D 5/181; F28F 2210/08; F28F 3/12; F28F 3/048; F28F 2215/04; F28D 2021/0021
See application file for complete search history.

(56) References Cited

U.S. PATENT DOCUMENTS

| | | | |
|---|---|---|---|
| 5,151,012 A | * | 9/1992 | Hough ............... F01D 5/181 416/95 |
| 6,698,509 B2 | | 3/2004 | Rong |

(Continued)

FOREIGN PATENT DOCUMENTS

EP 2573449 B1 6/2020

OTHER PUBLICATIONS

International Search Report and Written Opinion of the International Searching Authority for corresponding International Patent Application No. PCT/US2022/013048, mailed Jan. 10, 2023.
(Continued)

*Primary Examiner* — Frantz F Jules
*Assistant Examiner* — Jason N Thompson
(74) *Attorney, Agent, or Firm* — Renner, Otto, Boisselle & Sklar, LLP

(57) ABSTRACT

A heat exchanger including a fluid circuit in which an incoming fluid stream is progressively divided into multiple smaller streams, each of which delivers the heat exchange fluid into one or more heat exchange sections of the device; and/or in which multiple fluid streams of the fluid circuit are discharged from one or more heat exchanger sections, each of which are progressively combined into one or more larger streams before exiting the device. The heat exchanger may (Continued)

have a thin body portion and a thick body portion and may adapt a depth of the fluid circuit to the changes in thickness of the heat exchanger body. The heat exchanger may form a structural component and may integrate multiple materials to provide both heat exchange and structural functionality into a single device. Other structural fluid transfer devices having fluid flow and structural functionality also are provided.

15 Claims, 21 Drawing Sheets

Related U.S. Application Data filed on Jan. 22, 2021, provisional application No. 63/139,900, filed on Jan. 21, 2021.

(51) Int. Cl.
*F28D 21/00* (2006.01)
*F28F 3/04* (2006.01)
*F28F 3/12* (2006.01)

(56) References Cited

U.S. PATENT DOCUMENTS

| | | | |
|---|---|---|---|
| 8,162,202 B2 | 4/2012 | Milburn | |
| 8,420,226 B2 | 4/2013 | Ehrstrom et al. | |
| 8,434,324 B2 | 5/2013 | Nishino et al. | |
| 8,616,834 B2 | 12/2013 | Knight, III et al. | |
| 9,909,448 B2 | 3/2018 | Gerstler et al. | |
| 9,937,588 B2 | 4/2018 | Fukuda | |
| 9,945,325 B2 | 4/2018 | Roberge | |
| 10,196,932 B2 | 2/2019 | Sennoun | |
| 10,260,523 B2 | 4/2019 | Snyder | |
| 10,378,556 B2 | 8/2019 | Zaccardi et al. | |
| 10,392,952 B2 | 8/2019 | Zaccardi et al. | |
| 10,634,054 B2 | 4/2020 | Schmitz | |
| 10,688,592 B1 | 6/2020 | Vickers | |
| 10,697,312 B2 | 6/2020 | Boutaleb et al. | |
| 2006/0093480 A1* | 5/2006 | Cunha | F01D 5/187 416/97 R |
| 2006/0174611 A1 | 8/2006 | Dilley et al. | |
| 2009/0178410 A1 | 7/2009 | Straza | |
| 2011/0132585 A1 | 6/2011 | Chen et al. | |
| 2011/0226445 A1* | 9/2011 | Brand | F28F 3/12 165/70 |
| 2012/0243970 A1 | 9/2012 | Hellgren et al. | |
| 2014/0162107 A1* | 6/2014 | Obrist | H01M 10/617 165/46 |
| 2015/0000865 A1* | 1/2015 | Ueda | F28F 3/12 165/51 |
| 2015/0053372 A1* | 2/2015 | Seitz | H01M 10/6556 165/41 |
| 2017/0284417 A1* | 10/2017 | Zaccardi | F01D 9/065 |
| 2017/0292531 A1* | 10/2017 | Snyder | F02C 7/14 |
| 2018/0023406 A1 | 1/2018 | Zaccardi et al. | |
| 2018/0024599 A1 | 1/2018 | Sakata et al. | |
| 2018/0058225 A1 | 3/2018 | Marsh et al. | |
| 2019/0145264 A1 | 5/2019 | Jonnalagadda et al. | |
| 2019/0358740 A1 | 11/2019 | Hori et al. | |
| 2019/0393133 A1 | 12/2019 | Asai et al. | |
| 2020/0041212 A1 | 2/2020 | Palmer et al. | |
| 2020/0284531 A1 | 9/2020 | Maynard et al. | |
| 2020/0284532 A1 | 9/2020 | Becene et al. | |
| 2022/0153085 A1* | 5/2022 | Djallal | H01M 10/613 |

OTHER PUBLICATIONS

Second Written Opinion of the International Preliminary Examining Authority for corresponding International Application No. PCT/US2022/013048, mailed Jun. 21, 2023.

* cited by examiner

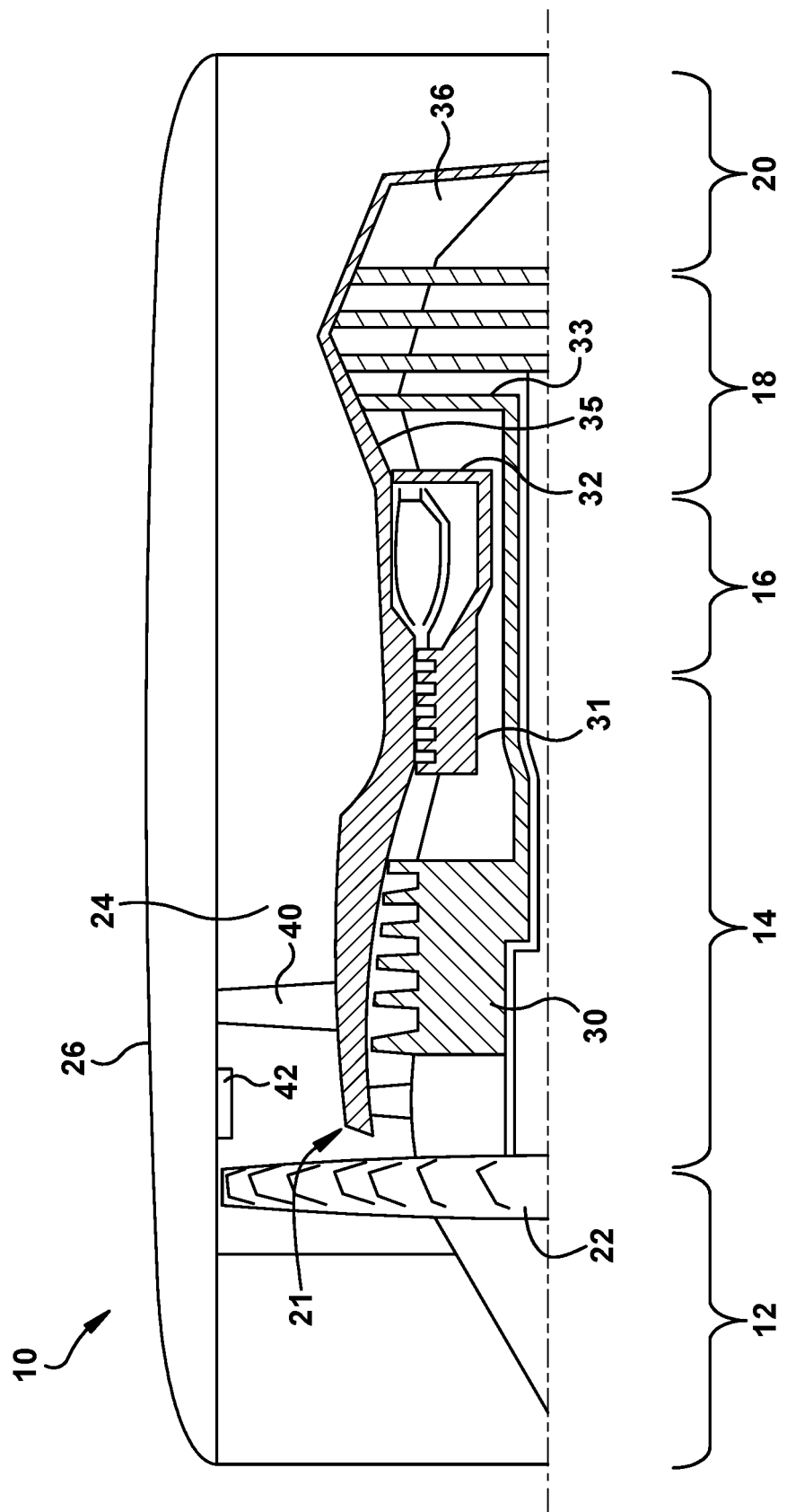

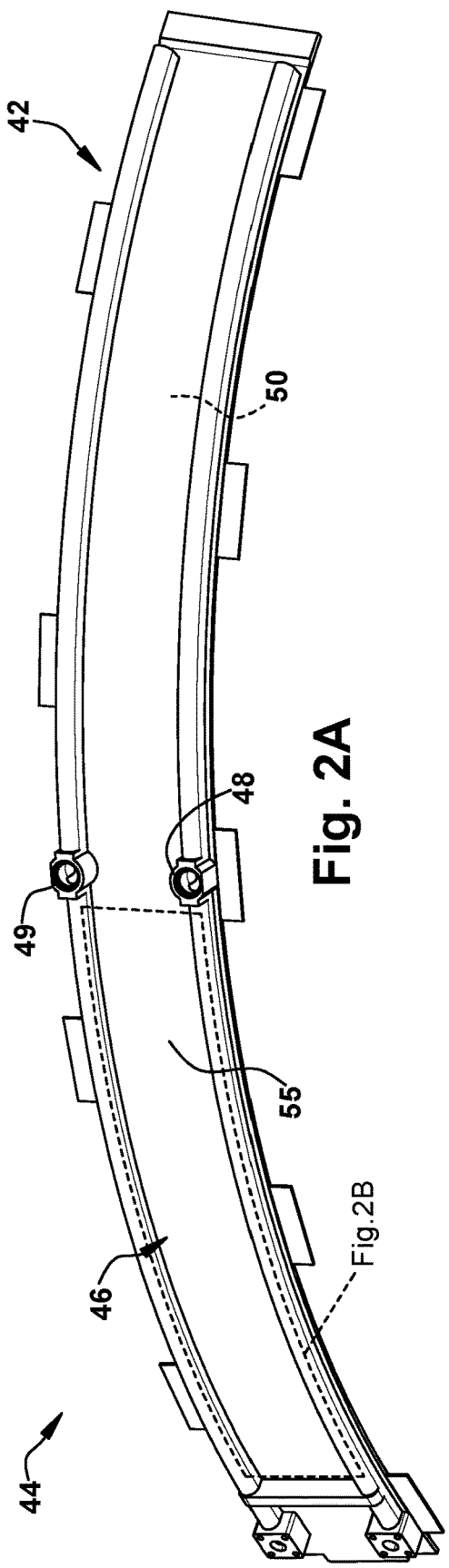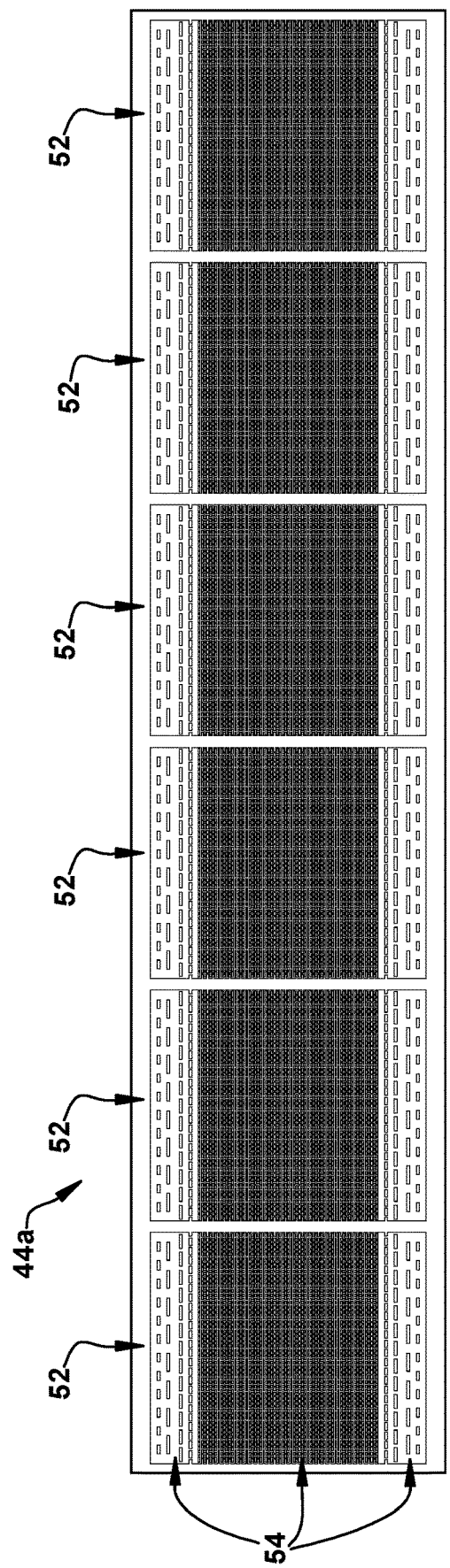

HEAT EXCHANGER WITH PROGRESSIVE DIVIDED FLOW CIRCUIT, STRUCTURAL LOAD BEARING DESIGN

RELATED APPLICATIONS

This application is a national phase of International Application No. PCT/US2022/013048 filed Jan. 20, 2022, which claims the benefit of U.S. Provisional Application No. 63/288,170 filed Dec. 10, 2021, U.S. Provisional Application No. 63/139,900 filed Jan. 21, 2021, and U.S. Provisional Application No. 63/140,303 filed Jan. 22, 2021, the entire disclosure of each of which is hereby incorporated herein by reference in its entirety.

TECHNICAL FIELD

The present disclosure relates generally to heat exchangers, and more particularly to a heat exchanger with a unique flow circuit and/or structural load bearing design, which may be used in severe-service applications such as in aerospace engines or the like. The present disclosure also relates to fluid transfer devices in general having a load bearing design.

BACKGROUND

Aircraft gas turbine engines require extensive use of heat exchangers to thermally manage various operating fluids. For example, lubricants are commonly used to circulate through lubrication chambers of roller bearings supporting engine shafts and/or the fan hub, or can be used for lubricating mechanical transmission elements such as the accessory gear box, fan drive reduction gearbox, or the like. The temperature of the lubricant generally increases with such use, and the aircraft heat exchangers are adapted to provide suitable cooling of the lubricant. These heat exchangers, however, add weight, compete for limited available space claim on the engine, and generally increase the specific fuel consumption (SFC). Moreover, a growing trend in aircraft engine design is toward increasing efficiency by operating the engine at higher temperatures and adopting geared turbofan designs that allow for independent fan and turbine speeds. These trends increase the capacity demands on the aircraft heat exchangers to provide adequate cooling under these severe-service conditions.

SUMMARY

The aforementioned challenges have generally driven aircraft heat exchanger designs towards high aspect ratio configurations (large length-to-width ratio) that can be physically packaged onto existing engine components. There is still a need, however, in optimizing heat transfer efficiency and fluid flow distribution of such heat exchange devices, which may result in decreasing weight, reducing space, and minimizing specific fuel consumption of the aircraft.

An aspect of the present disclosure addresses one or more challenges of conventional heat exchanger designs by providing a highly-engineered and unique internal fluid flow configuration that optimizes heat transfer efficiency, flow distribution, and/or pressure drop management, resulting in a more compact, lightweight, and/or lower operational cost device.

According to an aspect, the heat exchanger includes a fluid circuit in which an incoming fluid stream is progressively divided into multiple smaller streams, each of which delivers the heat exchange fluid into one or more heat exchange sections of the device.

More particularly, according to an aspect a heat exchanger includes: a feed fluid circuit including a plurality of feed fluid passages; a heat exchange fluid circuit including a plurality of heat exchange fluid passages that are configured to provide a heat exchange relationship for the heat exchanger, the plurality of heat exchange fluid passages being fluidly connected to the feed fluid circuit in a downstream direction of the heat exchanger; and a discharge fluid circuit including a plurality of discharge fluid passages that are fluidly connected to the heat exchange fluid circuit in the downstream direction; wherein the feed fluid circuit includes at least a first feed section having a first set of the plurality of feed fluid passages, and a second feed section having a second set of the plurality of feed fluid passages, the second feed section being located downstream of the first feed section, and wherein each of the second set of the plurality of feed fluid passages is progressively smaller than each of the first set of feed fluid passages, as measured by cross-sectional area transverse to a direction of downstream fluid flow through the passages, such that fluid from at least the first feed section to the second feed section is divided into progressively smaller flow paths in the downstream direction.

According to another aspect, the heat exchanger includes a fluid circuit in which multiple fluid streams are discharged from one or more heat exchanger sections, each of which are progressively combined into one or more larger streams before exiting the device.

More particularly, according to an aspect, a heat exchanger includes: a feed fluid circuit including a plurality of feed fluid passages; a heat exchange fluid circuit including a plurality of heat exchange fluid passages that are configured to provide a heat exchange relationship for the heat exchanger, the plurality of heat exchange fluid passages being fluidly connected to the feed fluid circuit in a downstream direction of the heat exchanger; and a discharge fluid circuit including a plurality of discharge fluid passages that are fluidly connected to the heat exchange fluid circuit in the downstream direction; wherein the discharge fluid circuit includes at least a first discharge section having a first set of the plurality of discharge fluid passages, and a second discharge section having a second set of the plurality of discharge fluid passages, the second discharge section being located downstream of the first discharge section, and wherein each of the second set of the plurality of discharge fluid passages is progressively larger than each of the first set of discharge fluid passages, as measured by cross-sectional area transverse to a direction of downstream fluid flow through the passages, such that fluid from at least the first discharge section to the second discharge section is combined into progressively larger flow paths in the downstream direction.

In exemplary embodiments, the heat exchanger includes both the feed fluid circuit with progressive dividing of the streams into the heat exchanger fluid circuit, and the discharge fluid circuit with progressive combination of the streams from the heat exchanger fluid circuit.

An aspect of the present disclosure also addresses one or more challenges of conventional heat exchanger designs by tailoring the fluid flow paths based on changes in thickness of the heat exchanger device.

According to an aspect, a heat exchanger includes: a heat exchanger body including a thin heat exchange section and a thick heat exchange section that is thicker in transverse cross-section than the thin heat exchange section, the heat exchanger body including a plurality of fluid flow paths configured to provide heat exchange relationship for the heat exchanger, the plurality of fluid flow paths extending from the thick heat exchange section to the thin heat exchange section, wherein a depth of the plurality of flow paths is adapted to the thickness of the heat exchanger body, such that the plurality of fluid flow paths in the thick section are deeper than the plurality of fluid flow paths in the thin section.

Another challenge with heat exchanger design is that the fabrication of complex fluid passages may demand sophisticated machining or additive manufacturing processes, whereas the fabrication of the external walls may be by way of a joining process to facilitate a more economical manufacturing solution. To enhance the heat exchange functionality of the device, the structures forming the fluid passages and the surfaces providing heat exchange relationship with the external environment generally are formed with a higher thermal conductivity material. Such material, however, comes at the cost of relatively lower strength.

It would be beneficial, however, to make the heat exchanger structurally load-bearing by integrating the device into an existing load-bearing structure of the aircraft engine. This would reduce or eliminate extra space, further decrease system weight, and/or decrease SFC by lowering net drag through the reduction or elimination of extra heat exchanger devices. Such higher strength materials suitable for structural load-bearing application, however, generally have lower thermal conductivity and generally are not readily joinable by the processes that facilitate complex structures, which limits material selection.

In view of the foregoing, a multifunctional component, such as a structural heat exchanger, that combines heat exchange functionality and structural capability would appear to require trade-offs in material selection because of the disparity between joinability, high thermal conductivity and high material strength. An example is high strength aluminum alloys, such as those in the 2XXX, 7XXX, or 8XXX series, for example, which present challenges for welding, brazing and diffusion bonding due to reasons such as low melting points and corrosion issues resulting from joining processes; whereas a high thermal conductivity material, such as aluminum alloys in the 1XXX, 3XXX, or 6XXX series, for example, may not have sufficient strength to withstand the structural load-bearing capabilities required in an aircraft design.

An aspect of the present disclosure addresses such challenges by providing multi-functional device that integrates structural capability and heat transfer capacity through the joining of multiple materials best suited for these separate functions in an integrated device. The function of the structural material is to accommodate loading and/or other forces acting on the structure, whereas the functional element carries a lesser loading and/or force while maintaining its functionality.

According to an aspect, a multi-material heat exchanger includes: one or more heat exchange sections formed from a first material; one or more structural sections formed from a second material, wherein the second material has a higher strength than the first material; wherein the one or more heat exchange sections and the one or more structural sections are coupled to one another to form a single integrated heat exchanger having functions of a structural component and a heat transfer device.

According to another aspect, a method for manufacturing a complex, multifunctional structure includes utilizing a readily fabricated or joinable material to make a functional element, for example a heat exchanger, then using a suitable joining method to join the functional element to a structural element made from a material that has more limited joining material properties. The exemplary method of manufacture provides for the integration of the functional element, for example, heat transfer, and the structural element which bears mechanical load. The functional element of the device can be produced by many fabrication methods including brazing, diffusion bonding (welding) or additive manufacturing. Joining the functional element to the structural element can be done by a fusion joining process or a solid-state process, such as friction stir welding. The joining process should be suitable for the structural material.

According to another aspect, the present disclosure more generally provides a structural fluid transfer apparatus, including: a first material that forms one or more fluid flow passages through the apparatus; a second material that forms one or more structural members configured to distribute a majority of load across the apparatus, wherein the second material has a higher strength than the first material; and wherein the first material and the second material are coupled to one another to form a single integrated apparatus having functions of a structural component and a fluid transfer device.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 1 is a schematic cross-sectional side view of a portion of an aircraft engine which includes an exemplary heat exchanger according to an embodiment of the present disclosure.

FIG. 2A is a perspective view of an exemplary heat exchanger according to an embodiment of the present disclosure. FIG. 2B is an enlarge cross-sectional top view of a portion of the heat exchanger in FIG. 2A.

DETAILED DESCRIPTION

Figure 3:
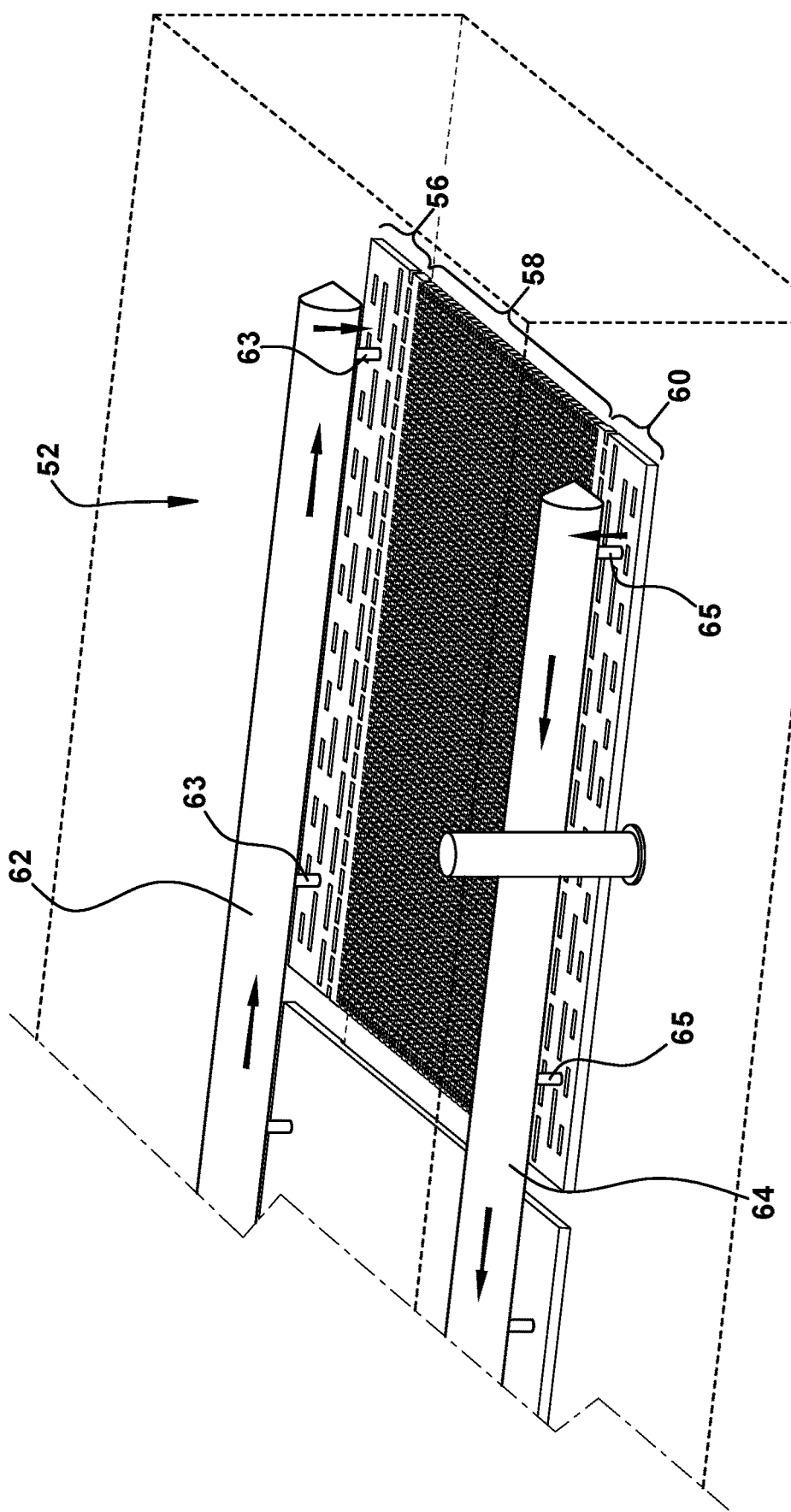
FIG. 3 is a perspective transparent view of a portion of the heat exchanger in FIG. 2A showing exemplary fluid conduits.

The principles and aspects according to the present disclosure have particular application for heat exchangers in gas turbine engines of aircraft, and thus will be described below chiefly in this context. It is also understood, however, that the principles and aspects according to the present disclosure may be applicable to heat exchangers or other fluid flow devices for other applications where it is desirable to provide the technology disclosed herein.

Referring to FIG. 1, a partial cross-sectional schematic view of an exemplary gas turbine aircraft engine 10 is shown. The gas turbine engine 10 generally includes an intake section 12, a compressor section 14, a combustion section 16, a turbine section 18, and an exhaust section 20.

The intake section 12 includes a fan 22 rotatably connected to a central hub 21. The fan 22 draws air into an annular casing 26 at the intake section 12 and accelerates some of this air toward the compressor section 14. The remaining air induced into the intake section 12 is accelerated into and through a bypass section 24. The air flows through the bypass section 24 and then out of the exhaust section 20 to provide forward thrust.

The compressor section 14 compresses the air received from the intake section 12 and increases the pressure of the air to a relatively high level. In the illustrated embodiment, the compressor section 14 includes two compressors, including an intermediate pressure compressor 30, and a high pressure compressor 31. The intermediate pressure compressor 30 increases the pressure of the air received from the intake section 12, and directs this compressed air into the high pressure compressor 31. The high pressure compressor 31 compresses the air even further relative to the intermediate compressor, and directs the high-pressure air into the combustion section 16. In the combustion section 16, the high-pressure air is mixed with fuel and combusted. The high-temperature combusted air is then directed into the turbine section 18.

The turbine section 18 may include one or more turbines disposed in series along the axial direction. For example, in the illustrated embodiment, the turbine section 18 includes at least a high pressure turbine 32 and a low pressure turbine 33. As shown, each turbine 32, 33 may be configured to drive associated components of the engine 10 via concentrically disposed shafts or spools. The combusted air from the combustion section 16 expands through each turbine 32, 33, causing the turbine blades of each turbine to rotate. As the air flows through the turbine section 18, the air is then exhausted through the exhaust section 20, such as via a nozzle 36, which can combine with the bypass air to generate additional thrust.

As shown, the central hub 21 of the engine is connected to the annular casing 26 by an annular array of radially extending fan outlet guide vanes ("FOGVs" or "OGVs") 40 which extend across the intake air flow path. In the illustrated embodiment, each of the OGVs 40 is an aero-directing element of the outlet air from the fan 22, and structurally connects the fan casing 26 and the central hub 21, withstanding the aerodynamic forces across the engine 10.

As is well-known in the art, lubricants (e.g., oil) and other fluids are circulated through the engine 10 and other parts of the aircraft to provide suitable functionality of the aircraft components. For example, lubricants are commonly used to circulate through lubrication chambers of roller bearings supporting engine shafts and/or the fan hub, or can be used for lubricating mechanical transmission elements such as the accessory gear box, fan drive reduction gearbox, or the like. Because the temperature of such fluids increase with their use, aircraft heat exchangers such as surface air-cooled oil coolers 42 ("SACOCs" or "ACOCs") are included on the aircraft to provide suitable cooling of the fluid. As shown, such heat exchangers (e.g., ACOCs) generally may be formed in the bypass flow path 24 where they are cooled by intake air. The ACOCs 42 may be mounted on a casing of the central hub 21 or on the outer annular casing 26 (as shown).

Turning to FIGS. 2A-7, an exemplary heat exchanger 44 according to an embodiment of the present disclosure is shown. In the illustrated embodiment, the heat exchanger 44 is in the form of an ACOC 42 which may be mounted in the bypass flow path 24 of the engine 10 as described above. In the illustrated embodiment, the ACOC-type heat exchanger 44 is adapted to be mounted from an inner diameter of the fan casing 26. As shown, the heat exchanger 44 generally includes a heat exchanger body 46 having at least one inlet 48, at least one outlet 49, and a plurality of fluid passages (described below) extending through the body 46 between the inlet 48 and outlet 49 to pass fluid (e.g., lubricant) through the body 46 and provide a heat exchange relationship with external surfaces 50 (e.g., concave underside) of the body over which the cooling air flows.

To enhance the external surface area of the heat exchanger body 46 and enhance cooling effect, the heat exchanger body 46 has a high aspect ratio with a length greater than its width. Also in the illustrated embodiment, the thickness of the heat exchanger body 46 is less than the width. As is conventional with ACOC heat exchangers, hot working fluid from the engine (e.g. lubricating oil or accessory cooling oil) is ported into the inlet 48 where fluid flows through the internal fluid passages (described in further detail below) and heat is removed from the fluid via heat transfer through internal structures and the external surface 50 over which cooling air flows (in this case fan bypass airflow). The cooled fluid then passes out through the outlet 49 and back to the remainder of the system. The fluid system may include pumps, filters, lines, valves, tanks, and other equipment to provide a flow of pressurized fluid, as is well-known in the art.

FIG. 2B shows an enlarged longitudinal cross-sectional flattened view of a portion 44a of the heat exchanger 44. As shown, this portion 44a of the heat exchanger is on one side of the inlet 48 and outlet 49, and includes multiple separate heat exchange segments 52, each of which establishes its own flow path. In the illustrated embodiment, the heat exchange segments 52 provide a single-pass parallel flow construction for the overall heat exchanger 44. It is understood, however, that the circulation of fluid flow through the heat exchanger 44 may be in any manner as may be desired for the particular application. For example, the heat exchanger 44 may provide single-pass counter flow, single-pass parallel flow, single-pass crossflow, or corresponding multi-pass configuration(s), or a combination of such configurations. The multiple heat exchange segments 52 also could be fluidly connected to each other to provide a serial configuration of flow from one section to the next. The heat exchanger 44 may employ multiple inlet and outlet channels that incorporate cross-linked passages and bleed gaps for flow balancing.

The heat exchanger 44 may have any suitable construction that provides the internal fluid passages (described below) and heat exchange functionality. In the illustrated embodiment, the heat exchanger 44 is configured as a plate-fin heat exchanger 44 having one or more fin arrays 54 (also described below) arranged at a core of the heat exchanger 44 with opposite plates 55 (or walls) sandwiching the core section containing the fins. This creates multiple flow passages and flow channels between the fin array(s) 54, as will be described in further detail below. Generally, the fin array(s) 54 can have any suitable configuration in any suitable arrangement, such as straight fins, wavy fins, round fins, shaped fins, fins in the form of pins (e.g., round, square, etc.), or the like (generally referred to herein as fin structures). The fins (e.g., rectangular fins) can be transverse, aligned or angled relative to the general flow direction. The fin array(s) 54 may be arranged in an array of columns and rows, which may be a regular aligned array, a staggered or offset array, or a combination of both. The fin array(s) 54 may be arranged with uniform or irregular spacing between the columns and rows as may be desired for flow and heat exchange optimization. In exemplary embodiments, the fin array(s) 54 are created by machining the flow channels around the fin structures into the core section of the heat exchanger 44 and then joining at least one plate 55, or outer wall, to the core section using a suitable joining technique.

Figure 4:
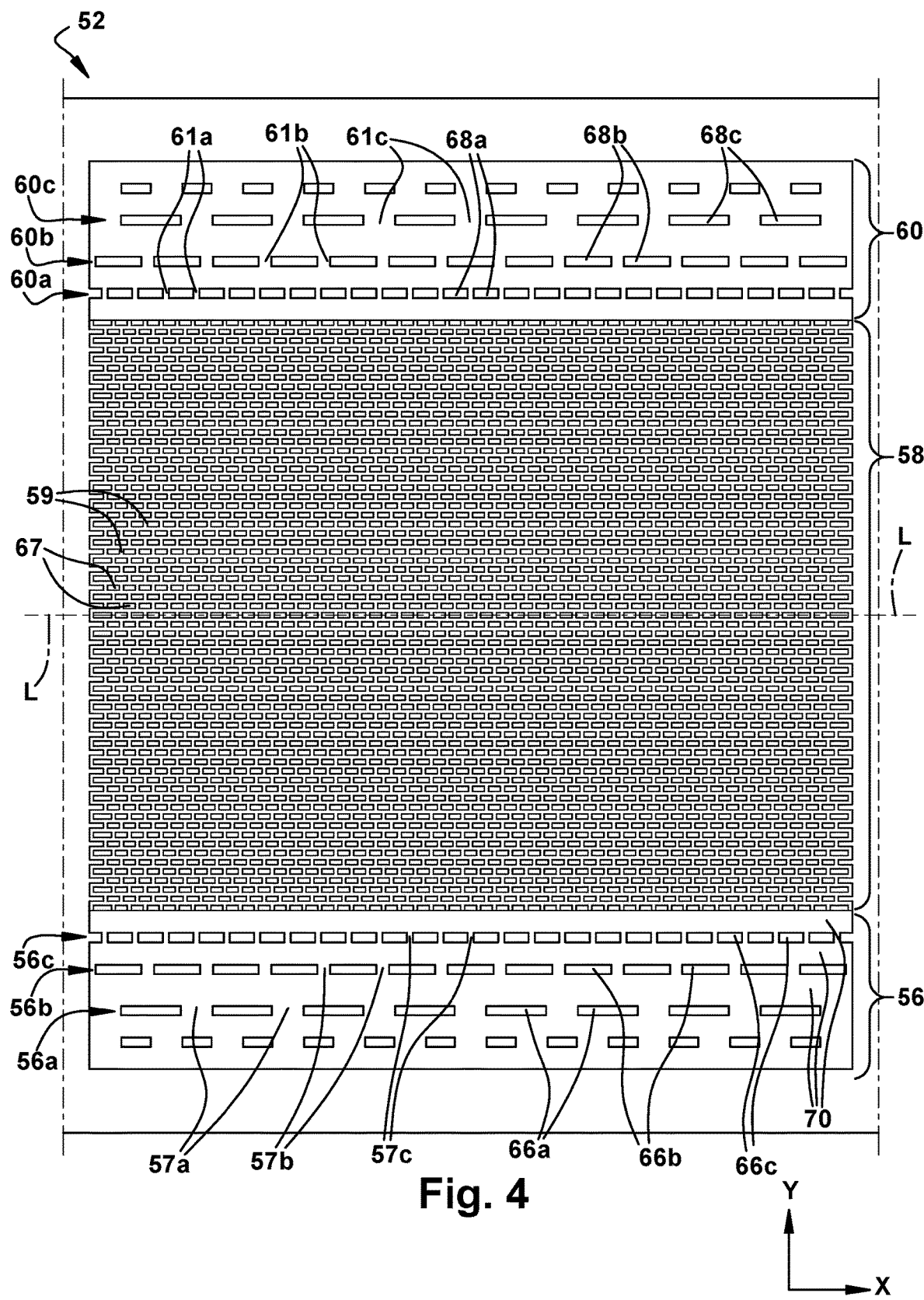
FIG. 4 is an enlarged cross-sectional top view of a heat exchange segment shown in FIG. 2B.
Figure 5:
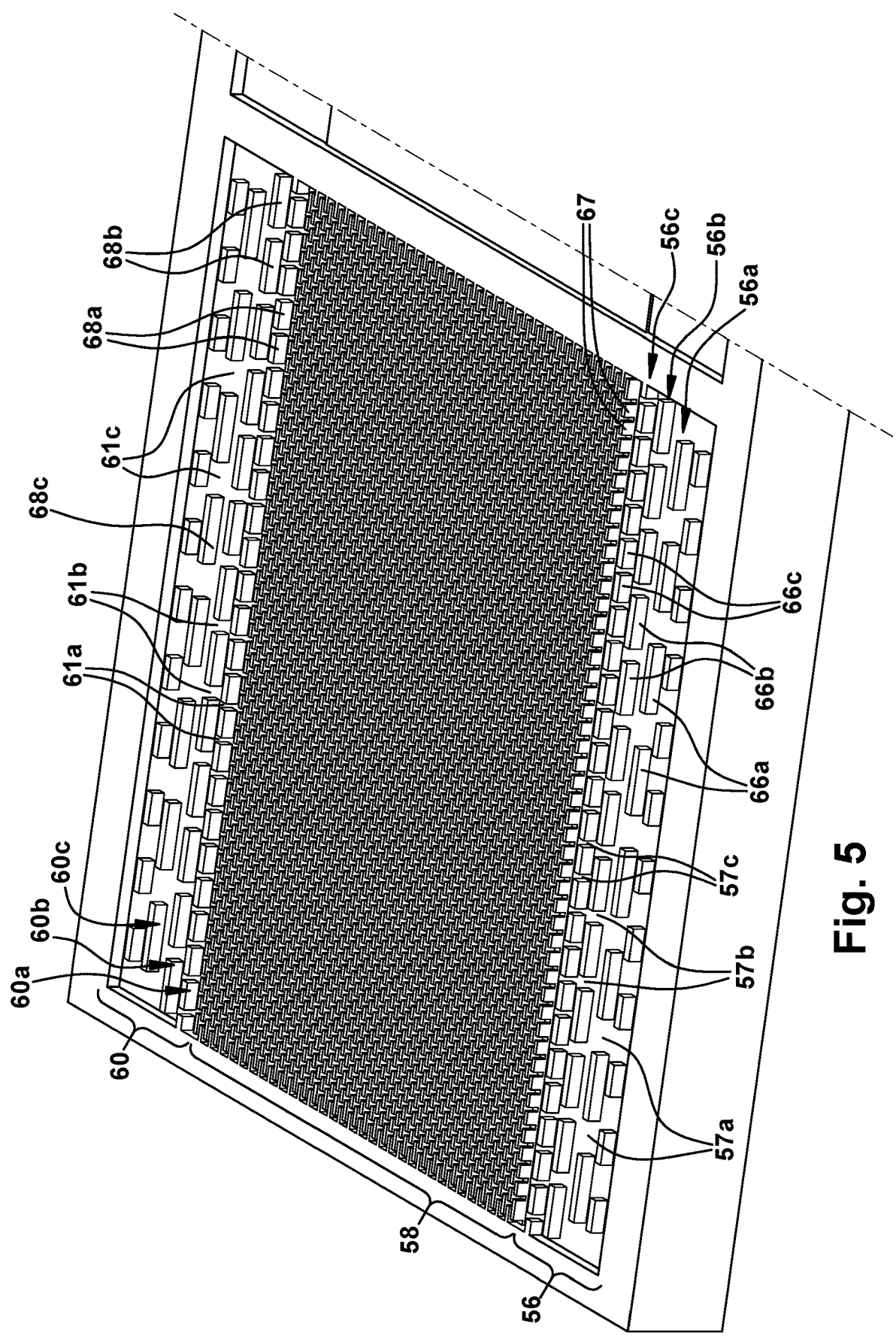
FIGS. 5-7 are enlarged perspective views of portions of the heat exchange segment shown in FIG. 4.
Figure 6:
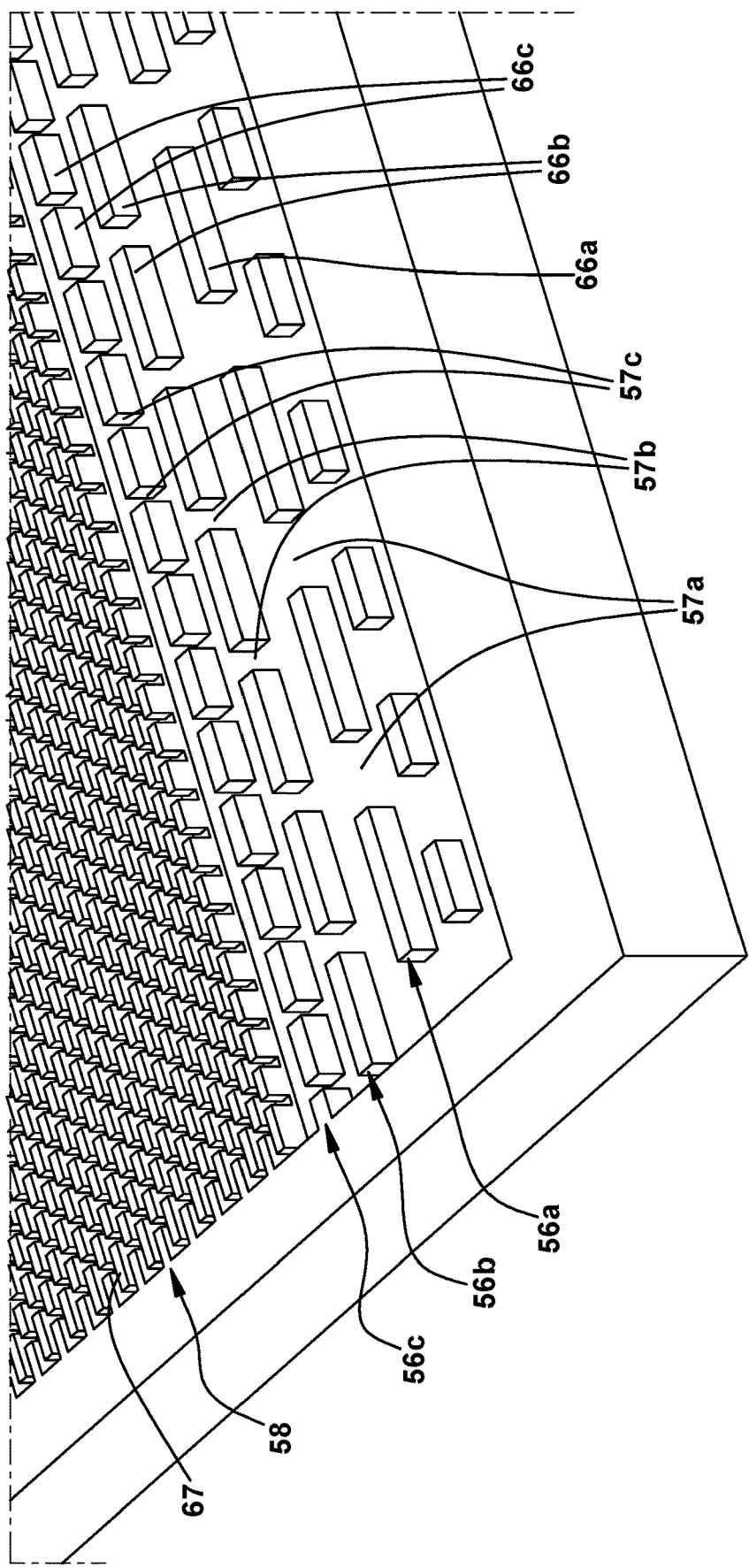
Figure 7:
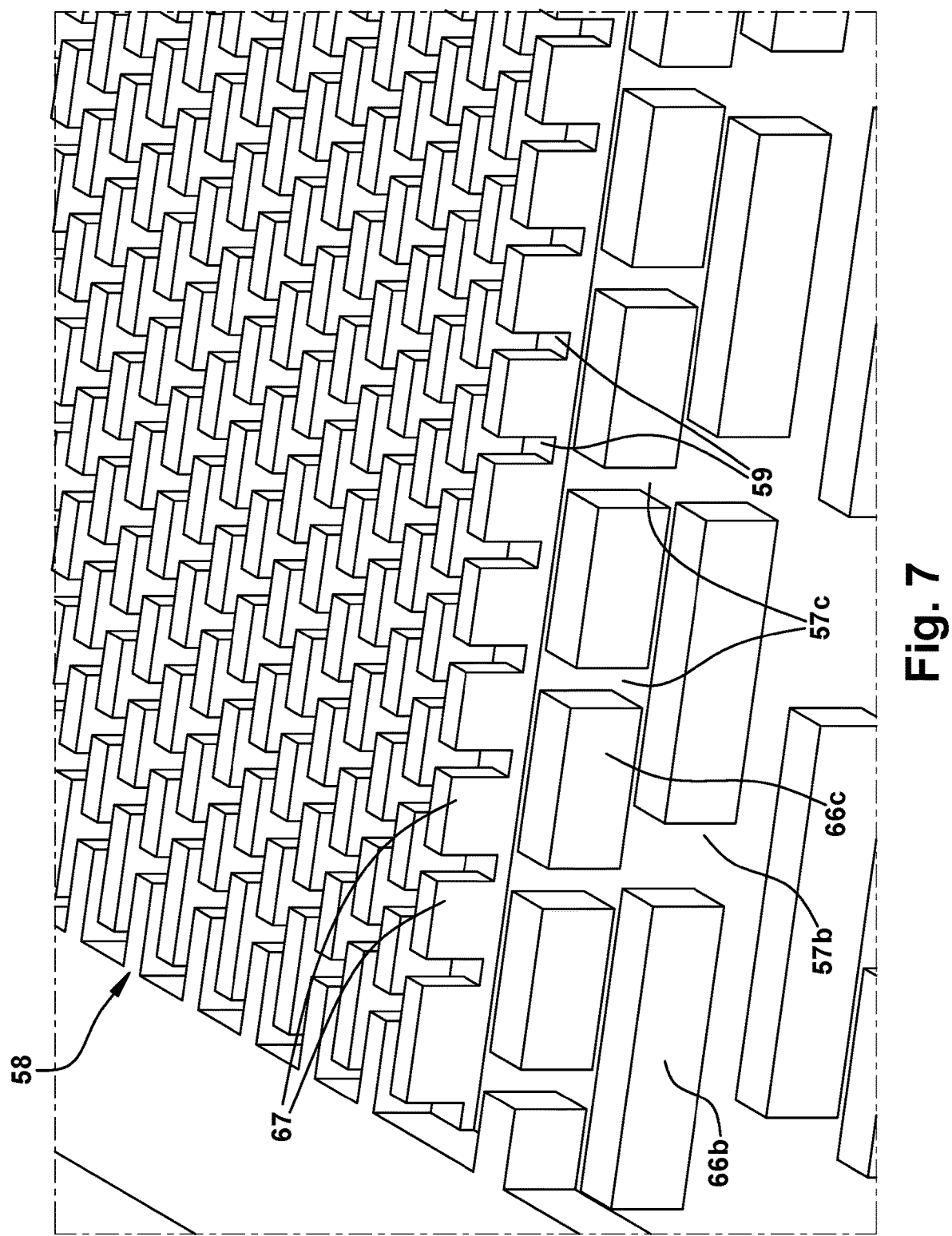

Turning to FIGS. 3-7, one heat exchange segment 52 of the heat exchanger 44 is shown in further detail. Referring particularly to FIG. 4, the heat exchanger 44 (or each heat exchange segment 52) includes a feed fluid circuit 56 including a plurality of feed fluid passages 57, a heat exchange fluid circuit 58 including a plurality of heat exchange fluid passages 59 fluidly connected downstream of the feed fluid circuit 56, and a discharge fluid circuit 60 including a plurality of discharge fluid passages 61 that are fluidly connected to the heat exchange fluid circuit 58 in the downstream direction (e.g., Y-direction in FIG. 4).

As described in further detail below, the exemplary heat exchanger 44 provides a highly-engineered and unique internal fluid flow configuration through the respective fluid circuits 56, 58, 60 that optimizes heat transfer efficiency, flow distribution, and/or pressure drop management of the device. According to one aspect, this is accomplished by the unique configuration of at least the feed fluid circuit 56 progressively splitting or dividing the incoming fluid stream(s) into multiple smaller streams, each of which delivers the heat exchange fluid into the heat exchange circuit 58 of the device. Alternatively or additionally, according to another aspect, such benefits are accomplished by the unique configuration of at least the discharge fluid circuit 60 which receives multiple fluid streams from the heat exchange circuit 58, and progressively combines these streams into one or more larger streams before exiting the device. In this manner, the feed circuit 56 and the discharge circuit 60 respectively form a diverging or converging hierarchy of fluid flow that respectively act to distribute fluid to downstream sections or collect fluid from upstream sections in an optimal way.

The progressive hierarchy of fluid flow provided by the feed circuit 56 and the discharge circuit 60 generally is such that the division or combination of flow develops gradually or in stages in the downstream flow direction. Such progression may be in uniform steps or stages in the downstream direction, or such progression may be non-uniform. The progressive hierarchy of the feed and discharge circuits 56, 60 can be essentially the same as each other (but reversed), or may be different from each other. In exemplary embodiments, the progression of one or more of the circuits 56, 60 may be recursive. For example, the feed circuit 56 may recursively divide flow into feed sections characterized by smaller and smaller geometric features or flow passages in the downstream direction, or the discharge circuit 60 may recursively combine flow into discharge sections characterized by larger and larger geometric features or flow passages in the downstream direction.

In exemplary embodiments, the progression of divided or combined fluid flow is accomplished by the respective feed and discharge fluid circuits 56, 60 within each heat exchange segment 52 of the heat exchanger 44, as shown in FIG. 2B. It is understood, however, that the heat exchanger 44 also could provide a serial configuration across the heat exchange segments 52, where each segment 52 provides progressively refined or coarsened geometric length scales that optimize heat transfer characteristics along the flow path (e.g. recursively combined channels where the channel widths/heights are appropriate for the flow in the channels). In such manner, an upstream heat exchange segment 52 would be considered the feed section and a downstream heat segment section would be considered the discharge section.

Referring particularly to FIG. 3, the heat exchange segment 52 is shown between an intake conduit 62 and a discharge conduit 64 of the heat exchanger 44. The intake conduit 62 is fluidly connected to the inlet 48 (FIG. 2A) of the heat exchanger 44 and transports hot fluid to the feed circuit 56 of the heat exchange segment 52. As described above, the portion 44a of the overall heat exchanger 44 may be on one side of the inlet 48, and thus flow from the inlet 48 into the intake conduit 62 may represent a first stage of divided flow of the incoming fluid stream. The intake conduit 62 still provides predominantly bulk fluid flow into the heat exchanger 44, and multiple feed lines 63 (e.g., tubes) may be provided to further divide and distribute the incoming fluid stream from the intake conduit 62 to the feed circuit 56 of the device.

Referring to FIGS. 4-7, the unique arrangement of the internal fluid flow passages and fin structures of the heat exchanger segment 52 are shown in further detail.

As shown in the illustrated embodiment, the fin structures 66 are generally arranged in one or more arrays of rows (X-direction) and columns (Y-direction), with different array arrangements in the different fluid circuits 56, 58, 60 depending on the intended function of the circuit. In exemplary embodiments, the fin structures 66 in each fluid circuit 56, 58, 60 are formed with different dimensions and spacing between fin structures 66 to establish the different size flow passages through the different circuits. In the illustrated embodiment, the fin structures 66 are formed with a rectangular shape, although it is understood that other shapes could be employed. As shown, the fin structures 66 in one or more of the fluid circuits 56, 58, 60 may be aligned with each other in rows along a lateral (X) direction, and may be staggered with respect to each other in columns in a longitudinal (Y) direction which corresponds to the downstream direction of the heat exchanger segment 52. It is understood, however, that different arrangement could be employed.

As described above, the feed fluid circuit 56 (also referred to as feed section 56) is generally configured to progressively split or divide fluid flow into multiple smaller streams in the downstream direction before being distributed into the heat exchange circuit 58. In exemplary embodiments, the feed fluid circuit 56 includes a first feed section 56a having a first set of larger feed fluid passages 57a (in cross-section to the direction of flow in the Y-direction), and a second feed section 56b having a second set of smaller feed fluid passages 57b downstream of the first feed section 56a. In exemplary embodiments, the feed section 56 may include more than two sections of progressive divided flow, and includes a third feed section 56c in the illustrated embodiment which has smaller fluid passages 57c in cross-sectional area than those in the second feed section 56b.

As is apparent in the illustrated embodiment, the flow paths being divided between feed sections 56a, 56b, 56c (collectively referred to with 56) via respective fluid passages 57a, 57b, 57c (collectively referred to with 57) can recombine briefly as fluid flows around the various fin structures 66a, 66b, 66c (collectively referred to with 66) into laterally extending channels 70 between rows of fin structures 66, before being divided further by the next section of fin structures 66. These channels 70 also may progressively reduce in size in the downstream direction among one or more of the feed sections 56a, 56b, 56c. Although such recombination of flow paths around the fin structures 66 is shown in the illustrated embodiment, it is understood that in alternative embodiments one or more of the divided flow paths may be branched off into separate smaller and smaller separated passages to feed a collection of the heat exchange area, for example.

The relative size of the feed fluid passages 57a, 57b, 57c in each feed section 56a, 56b, 56c is measured by their respective cross-sectional area transverse (X-direction) to a direction of downstream fluid flow (Y-direction) through the passages 57a, 57b, 57c. In the illustrated embodiment, where the fin structures 66 may have a uniform depth within the feed circuit 56, the cross-sectional area generally is defined by the lateral spacing between adjacent fin structures 66a, 66b, 66c in each section 56a, 56b, 56c, although the progressive refinement in cross-sectional area could be provided by changing the depth of each fluid passage, or both. The cross-sectional area in each section 56a, 56b, 56c of the feed circuit may be uniform or irregular, but in the illustrated embodiment the fin structures 66a, 66b, 66c are evenly spaced in each section 56a, 56b, 56c and thus the cross-sectional area of each fluid passage 57a, 57b, 57c in a row is uniform. Because of the progressively finer distribution of fluid passages 57a, 57b, 57c in the downstream direction, each progressive feed section 56a, 56b, 56c includes more fin structures 66a, 66b, 66c and passages 57a, 57b, 57c than its adjacent upstream section. In the illustrated embodiment, the progression of smaller fluid passages 57a, 57b, 57c from the first section 56a to the second section 56b to the third section 56c follows a recursive pattern. For example, in the illustrated embodiment the fluid passage lateral dimension (X-direction) progressively decreases from 0.250 inches to 0.050 inches, while maintaining a consistent fluid passage depth of 0.094 inches.

In exemplary embodiments, the fin structures may vary in depth from the bond plane, thereby resulting in different elevations at the fin base. Fin depth may be customized for the final cross-sectional size of the device. In the case of an OGV-type heat exchanger, the fins may be shallower in the region of the trailing edge of the vane, due to the thinner cross-section, as described in further detail below with respect to the embodiment in FIG. 8.

The heat exchange fluid circuit 58 (also referred to as heat exchange section 58) is located downstream and adjacent to the feed fluid circuit 56 and receives the divided fluid flow from the last feed section (e.g., third feed section 56c). In exemplary embodiments, the cross-sectional area of the fluid passages 59 in the heat exchange circuit 58 are progressively smaller than the feed fluid passages 57c in the adjacent upstream feed section (e.g., third feed section 57c). Such a reduction in size from the feed circuit 56 to the heat exchange circuit 58 may follow the same recursive model as the reduction in size through the feed circuit 56. As noted above, the progressive refinement of the size of feed fluid passages 57a, 57b, 57c downstream into the heat exchange circuit 58 can improve heat transfer efficiency, flow distribution, and/or pressure drop across the device. Similarly to the feed circuit 56, the cross-sectional area of fluid passages 59 in the heat exchange circuit 58 is generally defined by the lateral spacing between adjacent pin structures 67 in each row, and thus the one or more of the respective rows in the heat exchange circuit 58 may have more structures 67 and fluid passages 59 than the adjacent upstream feed fluid circuit 56.

The heat exchange circuit 58 is configured to provide a major portion of the heat exchange relationship of the fluid flowing through the heat exchange segment 52 with an external environment, such as the bypass air flowing over the external surface 50 of the heat exchanger 44, and thus the heat exchange fluid passages 59 and fin structures 67 are specifically arranged to provide such effect.

It is of course understood that heat exchange relationship may be provided by the fluid flowing through the feed fluid circuit 56 and the discharge fluid circuit 60, but the heat exchange fluid circuit 58 provides the majority of the heat exchange function in the illustrated embodiment. Accordingly, the area of the heat exchange fluid circuit 58 constitutes a majority of the heat exchange segment 52 in the illustrated embodiment. Similarly to the feed fluid circuit 56, the fin structures 67 in the heat exchanger fluid circuit are formed as rectangular features that establish an array of columns and rows, in which adjacent fin structures 67 in each row (X-direction) are aligned, and the fin structures 67 between columns (Y-direction) are staggered. In the illustrated embodiment, the heat exchange circuit 58 provides a uniform pin field array with equally spaced apart fin structures 67 across the rows and columns, as shown. It is understood, however, that a non-uniform array may be provided, such as a further progressive refinement or coarsening of the fluid passages through the heat exchange circuit 58 as may be desired.

The discharge fluid circuit 60 is configured to receive the multiple fluid streams downstream from the heat exchange fluid passages 59, and then progressively combine these streams into one or more larger streams before exiting the device. In exemplary embodiments, the discharge fluid circuit 60 includes a first discharge section 60a having a first set of smaller discharge fluid passages 61a (in cross-section to the direction of flow in the Y-direction), and a second discharge section 60b having a second set of larger discharge fluid passages 61b downstream of the first discharge section 60a. The discharge fluid circuit 60 may include more than two sections of progressive recombining flow, and includes a third discharge section 60c in the illustrated embodiment which has larger fluid passages 61c in cross-sectional area than those in the second discharge section 60b. In exemplary embodiments, the discharge fluid circuit 60, including respective discharge sections 60a, 60b, 60c (collectively referred to with 60), discharge fluid flow paths 61a, 61b, 61c (collectively referred to with 61), and fin structures 68a, 68b, 68c (collectively referred to with 68), is configured similarly to that of the feed fluid circuit 56, but in reverse, and thus for the sake of brevity is not described further herein. In the illustrated embodiment, the discharge fluid circuit 60 is constructed as a mirror image to that of the feed fluid circuit 58 about a lateral axis L (X-direction) that is perpendicular to the downstream flow direction (Y-direction).

Turning briefly back to FIG. 3, the discharge fluid conduit 64 is fluidly connected to the discharge fluid circuit 60 and is configured to transport the cooled fluid to the heat exchanger outlet 49 (FIG. 2A). As shown, similarly to the inlet side, but in reverse, multiple discharge lines 65 (e.g., tubes) may be provided to further combine the discharged fluid stream from the discharge fluid circuit 60 to the discharge fluid conduit 64. The discharge fluid conduit 64 then combines the bulk fluid streams from the opposite sides of the heat exchanger 44 to the outlet 49 where the fluid may be returned to its associated system.

Turning now to FIGS. 8-13, another exemplary embodiment of a heat exchanger 144 is shown. The heat exchanger 144 shares similarities in its design with the above-described heat exchanger 44, and consequently the same reference numerals but indexed by 100 are used to denote structures corresponding to similar structures in the heat exchangers 44, 144. In addition, the foregoing description of the heat exchanger 44 is equally applicable to the heat exchanger 144 except as noted below. It is also understood that aspects of the heat exchangers 44, 144 may be substituted for one another or used in conjunction with one another where applicable.

In the illustrated embodiment, the heat exchanger 144 is in the form of an outlet guide vane (OGV) 40 which may be mounted in the bypass flow path 24 of the engine 10, as described above, and which may be used to structurally connect the fan casing 26 to the central hub 21 and can withstand the aerodynamic forces exerted upon it. In this embodiment, the OGV-type heat exchanger 144 is used to circulate and cool operating fluids, such as lubricants, similarly to the ACOC-type heat exchanger 44 described above.

Figure 8:
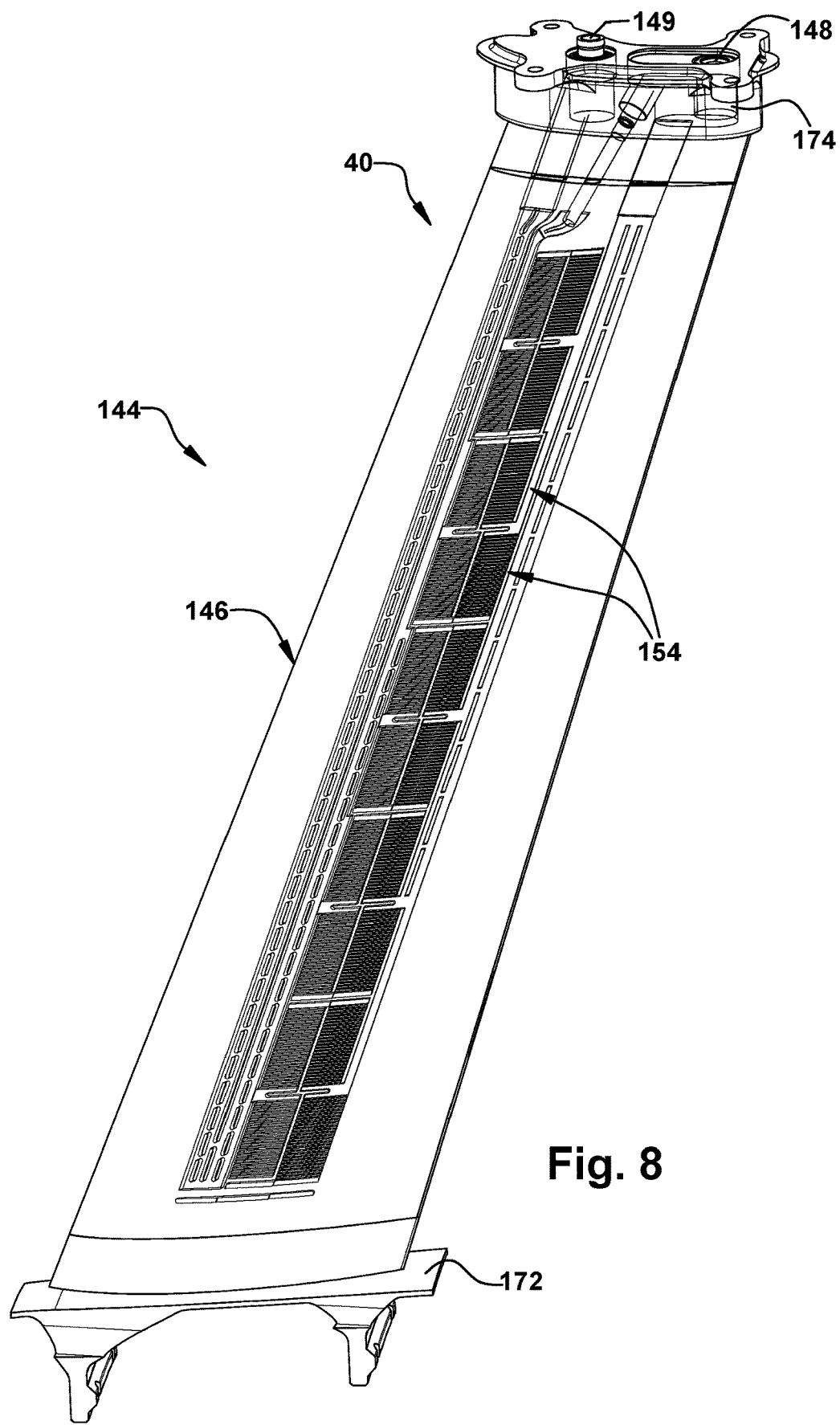
FIG. 8 is a perspective view of another exemplary heat exchanger according to an embodiment of the present disclosure.

The heat exchanger 144 generally includes a heat exchanger body 146 having at least one inlet 148, at least one outlet 149, and a plurality of fluid passages (described below) extending through the body 146 between the inlet 148 and outlet 149 to pass fluid (e.g., lubricant) through the body 146 and provide a heat exchange relationship with external surfaces of the body over which the cooling air flows. In FIG. 8, the external surface is removed from view to show the positions of heat exchange segments within the heat exchanger 144. The heat exchanger 144 extends along its length between a root 172 which is mounted to the central hub 21 of the engine 10, and a tip 174 (shown in transparent view) which is mounted to the fan casing 26.

Similarly to heat exchanger 44, the heat exchanger 144 is configured as a plate-fin heat exchanger 144 having one or more fin arrays 154 arranged at a core of the heat exchanger 144 with opposite plates (or walls) sandwiching the core section containing the fin arrays 154. Generally, the fin array(s) 154 can have any suitable configuration in any suitable arrangement, such as straight fins, wavy fins, round fins, shaped fins, fins in the form of pins (e.g., round, square, etc.), or the like (generally referred to herein as fin structures). The fin array(s) 154 may be arranged in an array of columns and rows, which may be a regular aligned array, a staggered or offset array, or a combination of both. The fin array(s) 154 may be arranged with uniform or irregular spacing between the columns and rows as may be desired for flow and heat exchange optimization. In exemplary embodiments, the fin array(s) 154 are created by machining the flow channels around the fin structures into the core section of the heat exchanger 144 and then joining at least one plate, or outer wall, to the core section using a suitable joining technique.

Figure 9:
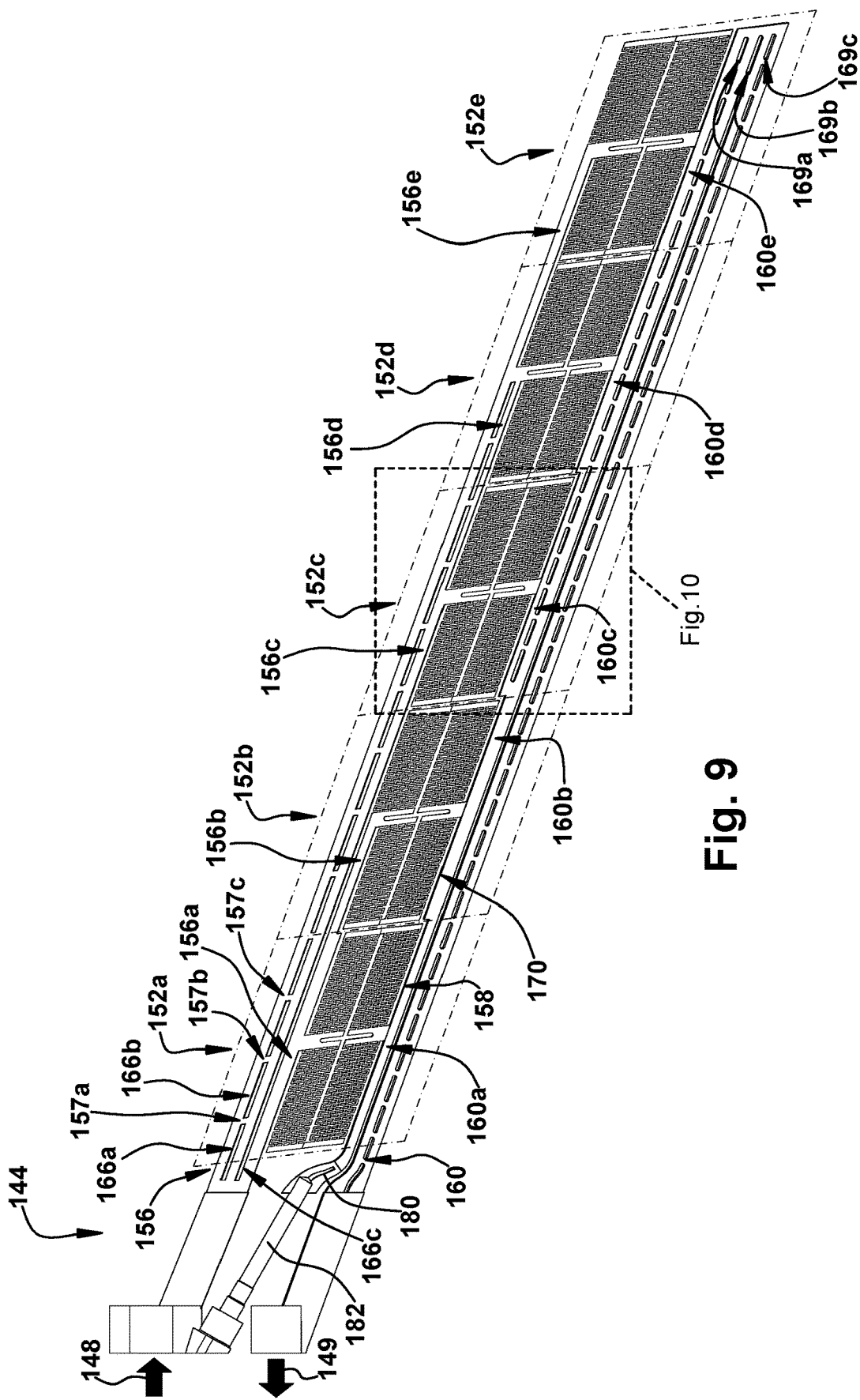
FIG. 9 is a perspective view of the fluid circuit of the heat exchanger shown in FIG. 8.

FIG. 9 shows the overall fluid circuit of the heat exchanger 144. As shown, the heat exchanger 144 includes multiple separate heat exchange segments 152a, 152b, 152c, 152d, 152e, each of which establishes its own flow path. In the illustrated embodiment, the respective heat exchange segments (collectively referred to as 152) provide a single-pass parallel flow construction for the overall heat exchanger 144. It is understood, however, that the circulation of fluid flow through the heat exchanger 144 may be in any manner as may be desired for the particular application. For example, the heat exchanger 144 may provide single-pass counter flow, single-pass parallel flow, single-pass cross-flow, or corresponding multi-pass configuration(s), or a combination of such configurations. The multiple heat exchange segments 152 also could be fluidly connected to each other to provide a serial configuration of flow from one section to the next. The heat exchanger 144 may employ multiple inlet and outlet channels that incorporate cross-linked passages and bleed gaps for flow balancing.

Similarly to the heat exchanger 44, the heat exchanger 144 includes at least one feed fluid circuit 156, at least one heat exchange fluid circuit 158 fluidly connected downstream of the feed fluid circuit 156, and at least one discharge fluid circuit 160 fluidly connected downstream of the heat exchange fluid circuit 158, in which the exemplary heat exchanger 144 provides a highly-engineered and unique internal fluid flow configuration through the respective fluid circuits 156, 158, 160 that optimizes heat transfer efficiency, flow distribution, and/or pressure drop management of the device. According to an aspect, this is accomplished by the unique configuration of at least the feed fluid circuit 156 progressively dividing the incoming fluid stream(s) into multiple smaller streams, each of which delivers the heat exchange fluid into the heat exchange circuit(s) 158 of the device, as described in further detail below. Alternatively or additionally, according to another aspect, such benefits are accomplished by the unique configuration of at least the discharge fluid circuit 160 which receives multiple fluid streams from the heat exchange circuit(s) 158, and progressively combines these streams into one or more larger streams before exiting the device, as described below.

Similarly to the heat exchanger 44, the heat exchanger 144 provides the progressive hierarchy of fluid flow in the feed circuit 156 and/or the discharge circuit 160 such that the division or combination of flow develops gradually or in stages in the downstream flow direction. Such progression may be in uniform steps or stages in the downstream direction, or such progression may be non-uniform. The progressive hierarchy of the feed and discharge circuits 156, 160 can be essentially the same as each other (but reversed), or may be different from each other. In exemplary embodiments, the progression of one or more of the circuits 156, 160 may be recursive. For example, the feed circuit 156 may recursively divide flow into feed sections characterized by smaller and smaller geometric features or flow passages in the downstream direction, or the discharge circuit 160 may recursively combine flow into discharge sections characterized by larger and larger geometric features or flow passages in the downstream direction.

In the illustrated embodiment, the feed fluid circuit 156 (also referred to as feed section 156) is generally configured to progressively divide fluid flow into multiple smaller streams in the downstream direction before being distributed into the heat exchange circuits 158 in a similar way as the feed fluid circuit 56 of the previously described embodiment. This is shown in the illustrated embodiment which shows the incoming feed stream being distributed at a first feed branch 156a, a second feed branch 156b, and subsequent feed branches 156c, 156d, 156e, similar in function to the multiple feed lines 63 in FIG. 3 for the previously described embodiment. The feed fluid circuit 156 includes fin structures 166a, 166b, 166c and so forth that direct the incoming flow towards the downstream heat exchange circuits 158. The fluid circuit 156 furthermore incorporates fluid passages or gaps 157a, 157b, 157c and so forth between feed branches 156b, 156c, 156d, 156e for the purpose of fluid pressure equalization.

Figure 10:
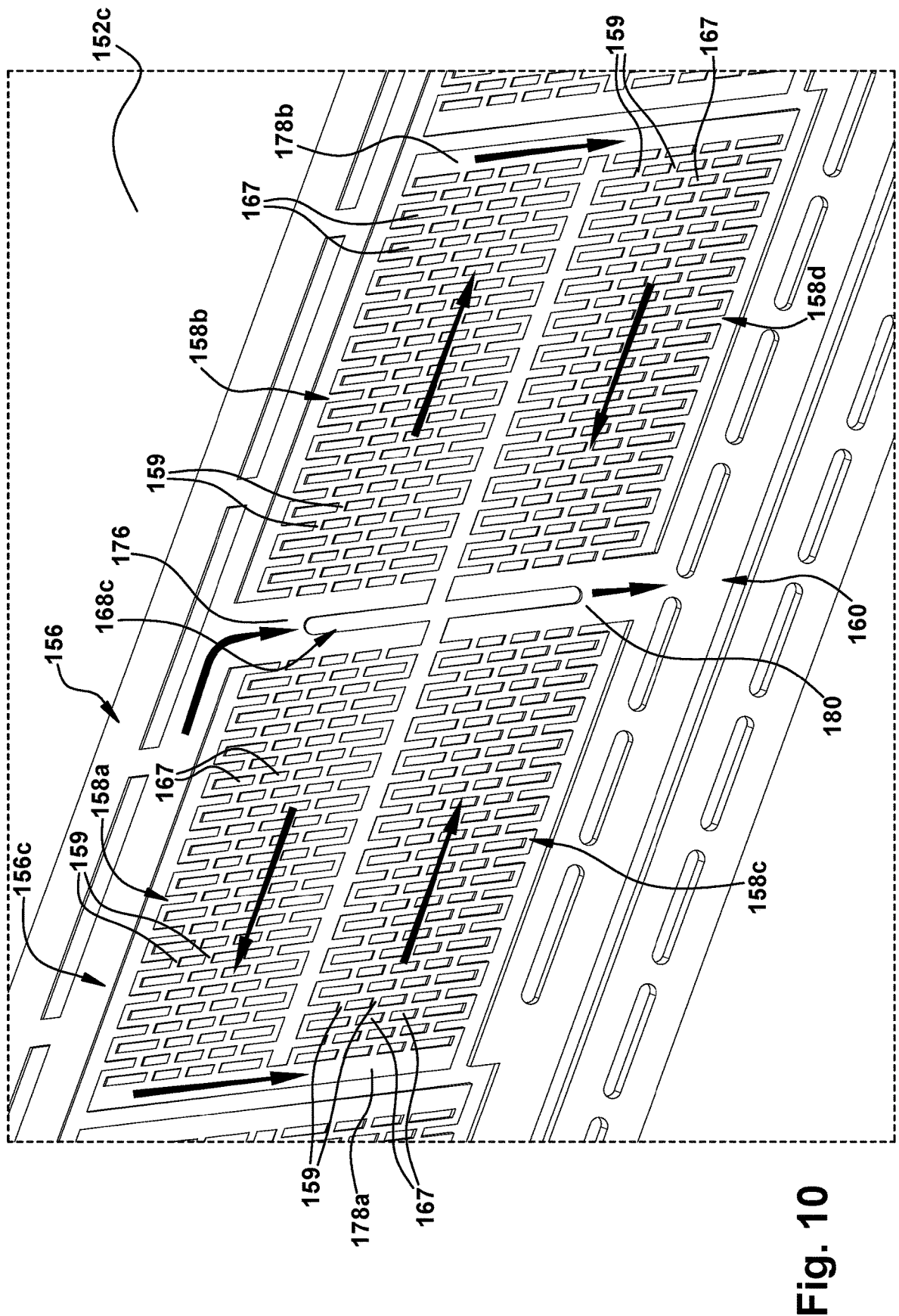
FIG. 10 is an enlarged perspective view of a heat exchange segment of the heat exchanger shown in FIG. 9.

Referring to FIG. 10, the unique arrangement of the internal fluid flow passages and fin structures of the heat exchange segment 152c, and specifically of the heat exchange circuit 158, are shown in further detail.

As shown, the heat exchange fluid circuit 158 (also referred to as heat exchange section 158) is located downstream of the feed fluid circuit 156 and receives the distributed fluid flow therefrom. Within the heat exchange segment 152c, the flow through the heat exchange circuit 158 is a multi-pass, counter flow arrangement. As shown, the incoming fluid stream from the feed circuit 156 is divided again in two different ways at a first intermediate section 176 to go into a first heat exchange section 158a and an opposite second heat exchange section 158b that are segregated by a dividing fin structure 168c. Each of these heat exchange sections 158a and 158b is formed the same in the illustrated embodiment to include fin structures 167 and corresponding heat exchange fluid passages 159, which are specifically arranged to provide suitable heat exchange functionality.

In exemplary embodiments, the cross-sectional area of the fluid passages 159 in the heat exchange sections 158a and 158b are progressively smaller than those in the feed fluid circuit 156. As noted above, the progressive refinement of the size of fluid passages into the heat exchange sections 158a, 158b can improve heat transfer efficiency, flow distribution, and/or pressure drop across the device. As shown, the cross-sectional areas of the fluid passages 159 in the heat exchange sections 158a, 158b are generally defined by the lateral spacing between adjacent fin structures 167 in the respective sections 158a, 158b.

After passing through each section 158a and 158b, the output flow will recombine briefly in respective second intermediate sections 178a, 178b to flow into respective additional heat exchange sections 158c and 158d to provide an additional counterflow pass through the overall heat exchange section. The heat exchange sections 158c and 158d are formed the same as the heat exchange sections 158a and 158b in the illustrated embodiment, although it is understood that one or more of these sections 158a-d may be formed differently. The respective output flows from the heat exchange sections 158c and 158d then recombine in a third intermediate section 180 before being distributed to the discharge fluid circuit 160.

Turning back to FIG. 9, the discharge fluid circuit 160 is configured to receive the multiple fluid streams downstream from the respective heat exchange sections (collectively referred to with 158), and then progressively combine these streams into one or more larger streams before exiting the device in a similar way as the discharge fluid circuit 60 of the previously described embodiment. This is shown in the illustrated embodiment which shows the combined flow of the outgoing discharge stream at a first discharge section 160a, a second discharge section 160b, and subsequent discharge sections 160c, 160d, 160e, similar in function to the multiple discharge lines 65 in FIG. 3 for the previously described embodiment.

Also as shown in FIG. 9, the discharge fluid circuit 160 is configured to transport the cooled fluid to the heat exchanger outlet 149. The discharge fluid circuit 160 includes fin structures 169a, 169b, 169c and so forth that direct the outgoing flow towards the heat exchanger outlet 149. The discharge fluid circuit 160 also may be fluidly connected to a fluid de-congeal circuit 180. A bypass flow valve 182 can be activated to allow fluid to flow directly through the outlet plenum 170 and back to the flow outlet 149. This allows the fluid to circumvent the heat exchange section 158 facilitating the flow of fluid through the device when operating conditions produce high fluid viscosity, therein providing a supplementary de-congeal function. Alternatively, the bypass flow valve 182 can be activated to allow for flushing of the associated fluid system. The bypass flow valve 182 can be activated by fluid pressure at the fluid inlet or remotely by other means.

Figure 11:
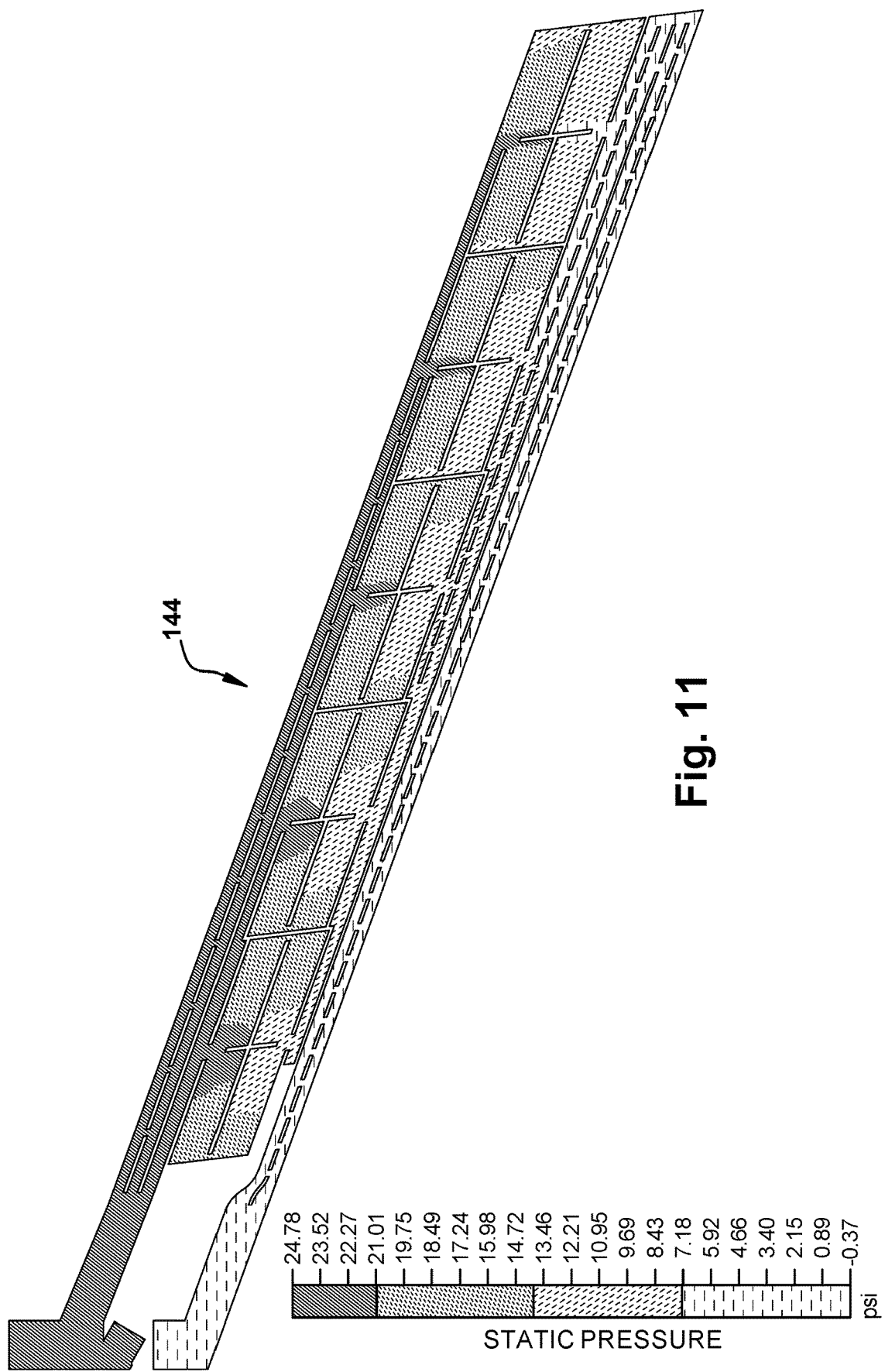
FIG. 11 illustrates static pressure distribution for the heat exchanger in FIG. 8 using a computational fluid dynamic (CFD) model.
Figure 12:
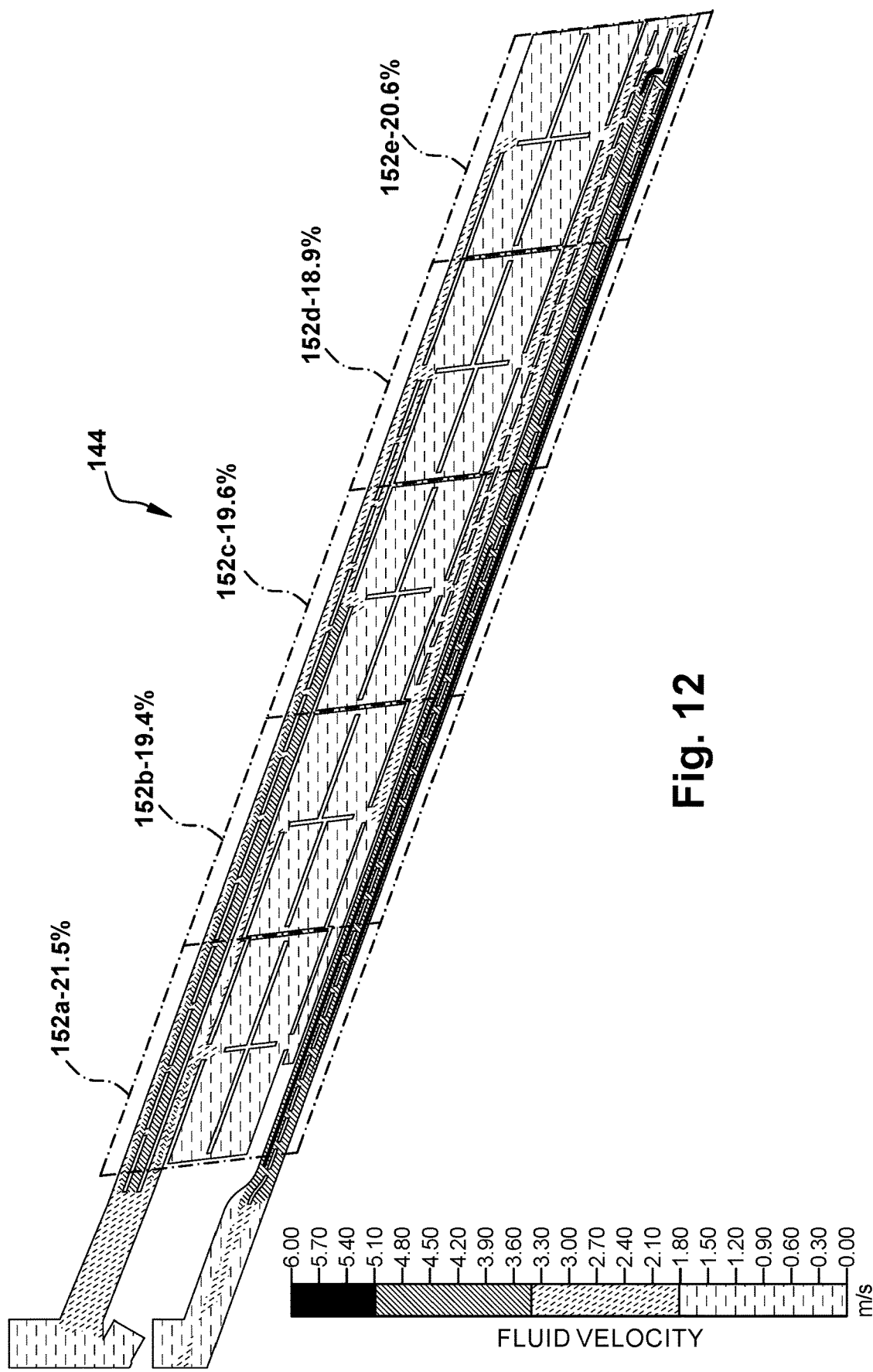
FIG. 12 illustrates flow velocity distribution for the heat exchanger in FIG. 8 using a computational fluid dynamic (CFD) model.
Figure 13:
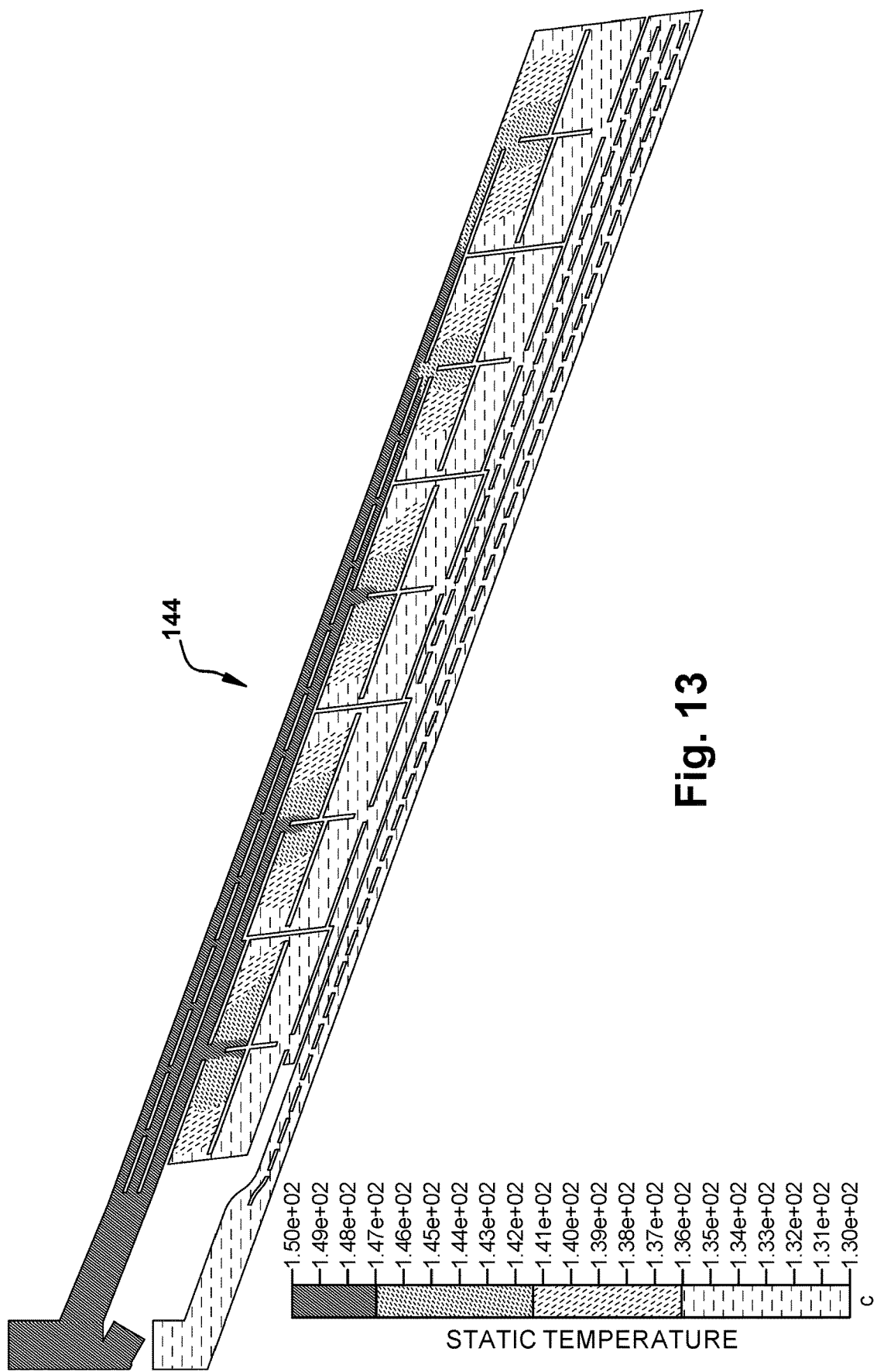
FIG. 13 illustrates temperature distribution for the heat exchanger in FIG. 8 using a computational fluid dynamic (CFD) model.

FIGS. 11-13 show the flow and heat transfer performance of the exemplary heat exchanger 144 that was optimized for fluid pressure drop, flow distribution, and heat transfer.

Referring to FIG. 11, illustrated is an example of the pressure drop optimization for the exemplary heat exchanger 144 using a computational fluid dynamic (CFD) model, with oil flow rate at 0.125 kg/s. As shown, the total pressure drop is 24.8 psi from inlet to outlet. The pressure drop through the respective feed circuits (inlet manifolds) using the exemplary progressive split or divided flow design is less than 6 psi. The pressure drop through the respective discharge circuits (outlet manifolds) is less than 7 psi.

FIG. 12 illustrates an example of the flow distribution optimization across the five heat exchange sections of the exemplary heat exchanger 144 using a CFD model, with oil flow rate at 0.125 kg/s. As shown, the distribution of fluid mass flux is 21.5% for Segment 152a, 19.4% for Segment 152b, 19.6% for Segment 152c, 18.9% for Segment 152d, and 20.6% for Segment 152e; thus showing a relatively uniform flow distribution across the five sections.

FIG. 13 illustrates an example of the heat transfer optimization for the exemplary heat exchanger 144 using a CFD model, with oil flow rate at 0.125 kg/s. As shown, the inlet temperature is 150° C. The outlet temperature is 131.3° C. The total amount of heat rejected for the OGV-type vane as shown is 5.04 kW. Accordingly, in an engine design utilizing 30 vanes, the total amount of heat rejected would be 151.27 kW.

Figure 14:
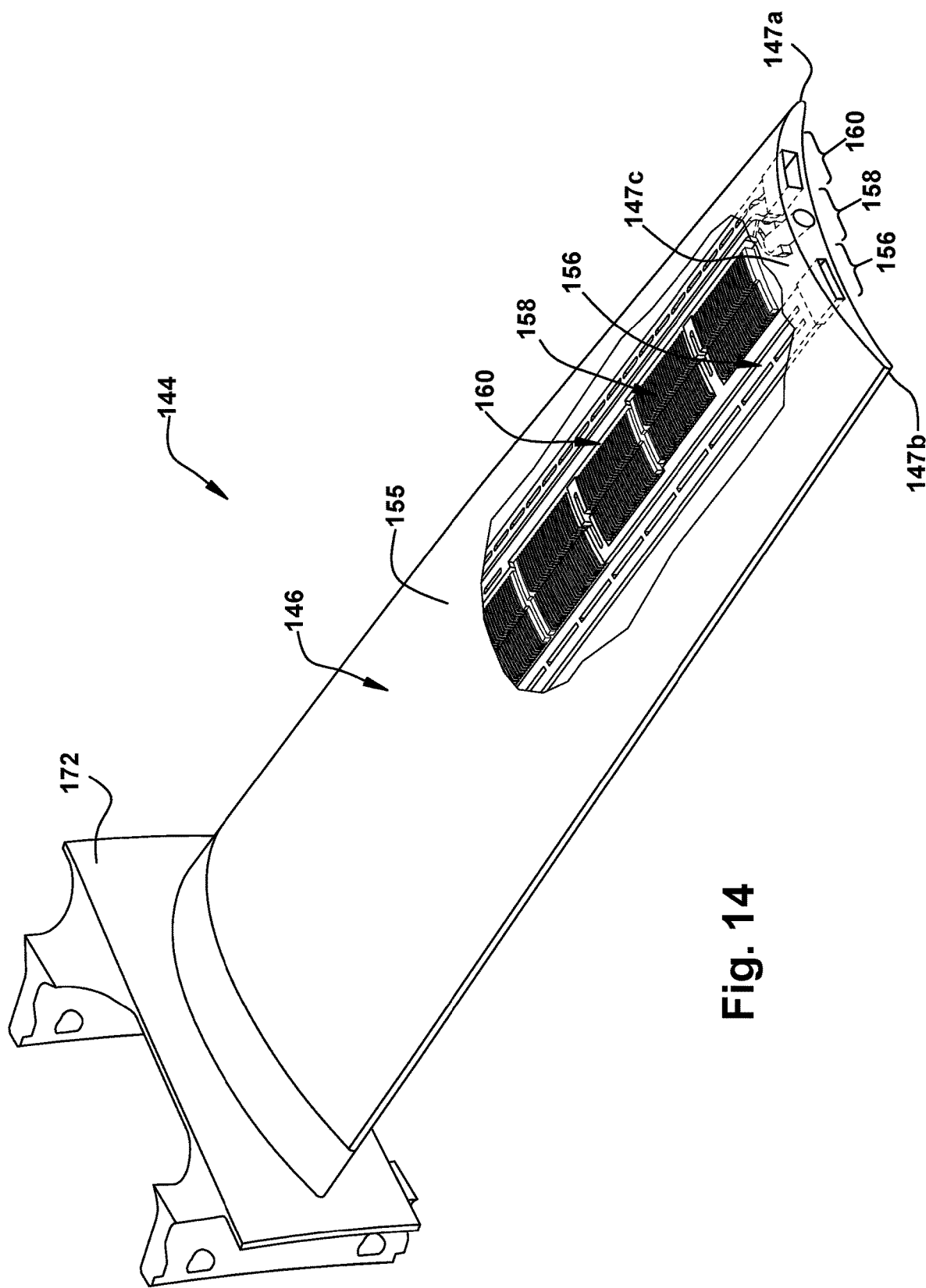
FIG. 14 is perspective view of the heat exchanger shown in FIG. 8, with an end in cross-section and with an outer surface broken away to show the fluid circuit therein, according to an embodiment.
Figure 15:
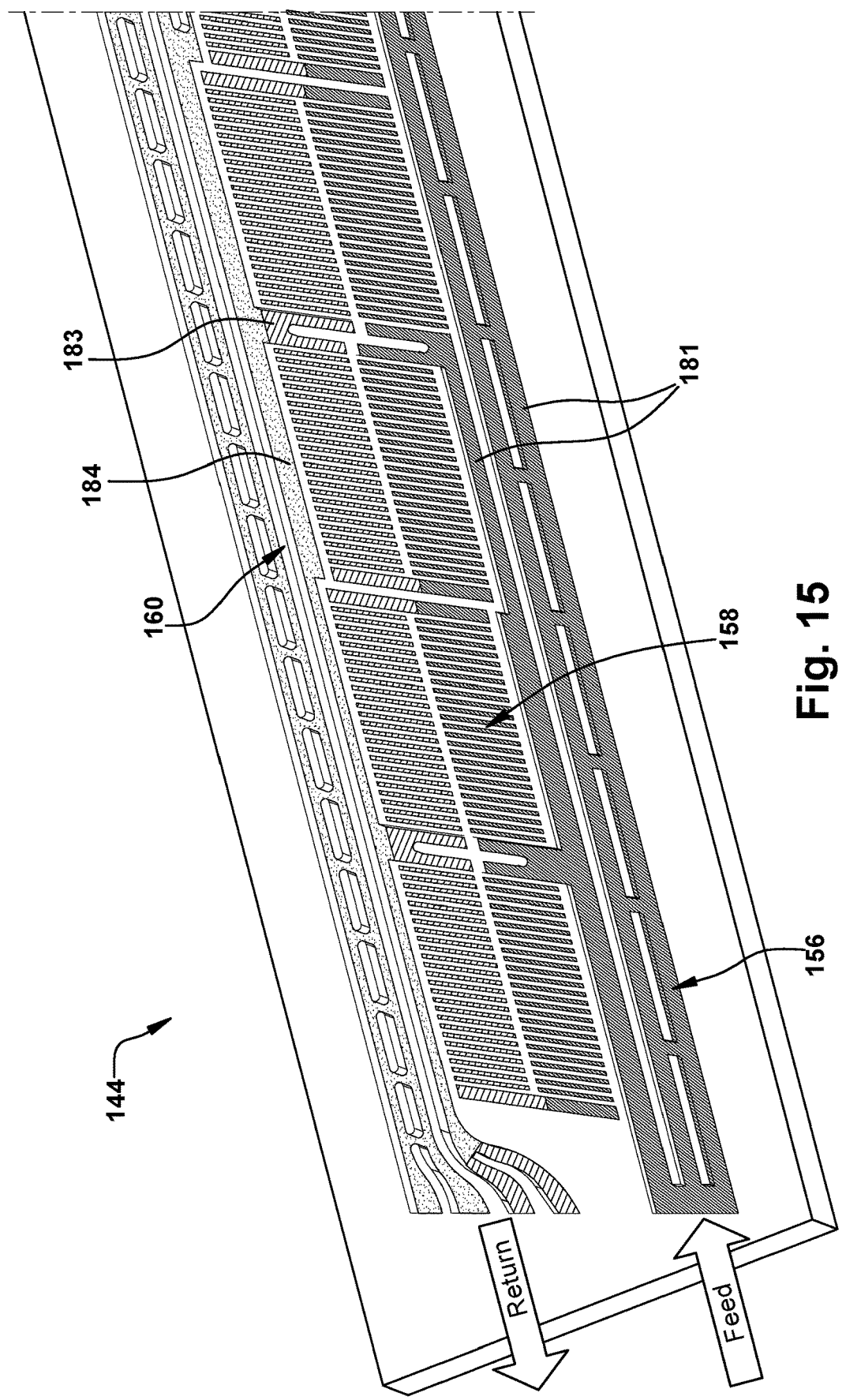
FIG. 15 is a flattened cross-sectional top view of the heat exchanger in FIG. 14 showing shaded regions corresponding to different depths of the fluid circuit.
Figure 16:
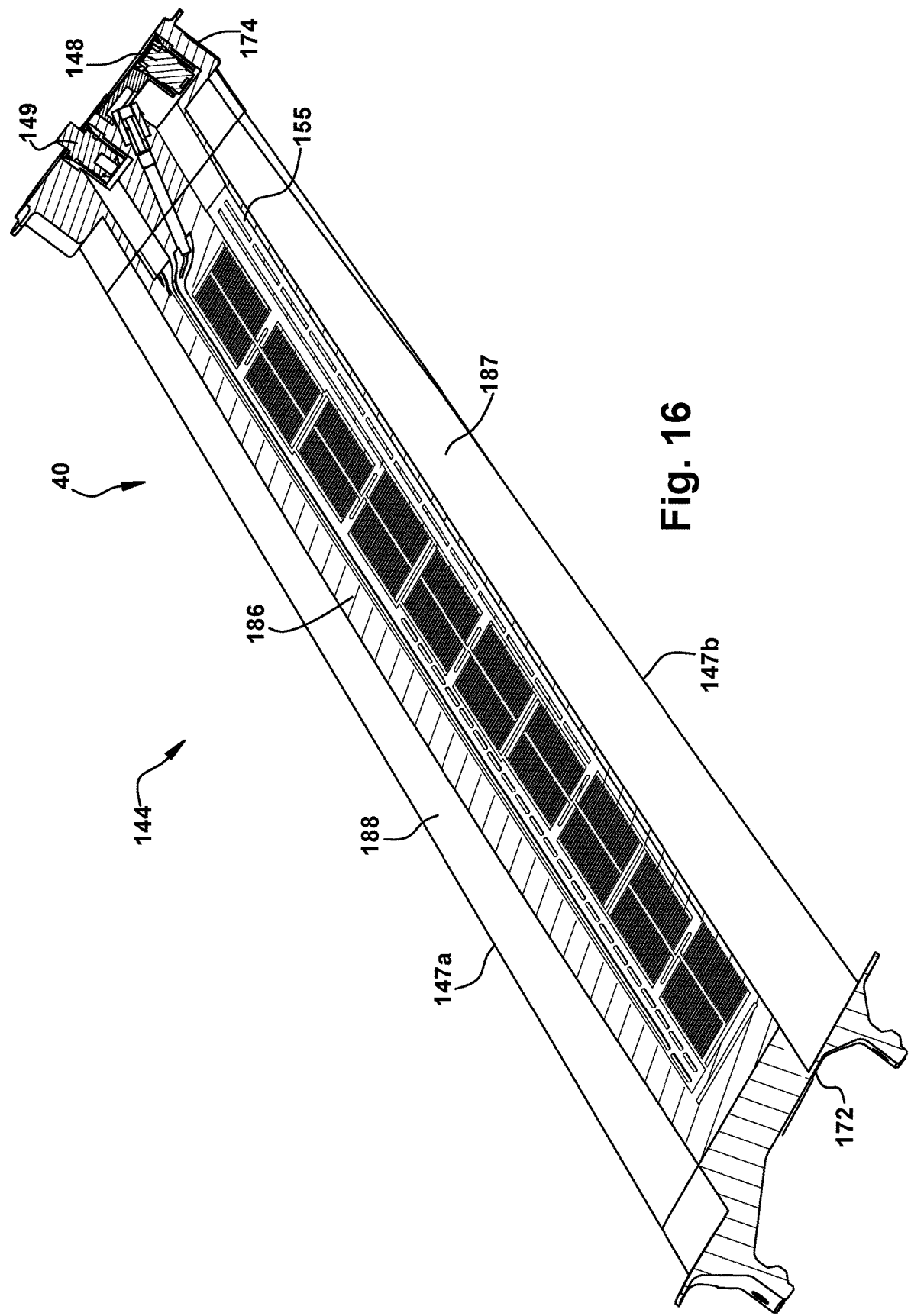
FIG. 16 is perspective view of the heat exchanger shown in FIG. 8, with an exemplary heat exchange section shown in shaded view to signify a different material as described herein according to an embodiment.

Turning to FIGS. 14 and 15, another aspect according to the present disclosure will now be described with exemplary reference to the embodiment of the OGV-type heat exchanger 144 described above. The OGV-type heat exchanger body 146 has an airfoil-shape in cross-section, including a thinning leading edge 147a, a thinning trailing edge 147b, and a thicker intermediate portion 147c between the leading and trailing edges 147a, 147b. In exemplary embodiments, the internal flow passage configuration (including the feed circuit 156, heat exchange circuit 158, and/or discharge circuit 160) is tailored for such a variable cross-sectional shape to maintain a minimum material wall thickness necessary to withstand material stresses imposed by both fluid pressure loads and mechanical or structural loads. This is accomplished in the illustrated embodiment by adapting a depth of the plurality of flow paths to the thickness of the heat exchanger body 146, such that the plurality of fluid flow paths in the thicker portion 147c are deeper than the plurality of fluid flow paths toward at least the leading edge 147a.

In FIG. 14, the feed fluid circuit 156, heat exchange fluid circuit 158, and discharge fluid circuit 160 are shown relative to the heat exchanger body 146, both in the cross-sectional end view and also with a portion of an external surface 155 of the heat exchanger broken away. As shown particularly in the cross-sectional end view, there is a change in depth of the internal flow passages relative to the change in thickness of the heat exchanger body 146. In the illustrated embodiment, for example, the feed circuit 156 is toward the thinner trailing edge 147b of the OGV-type heat exchanger and has shallower passages than the heat exchange section 158.

In FIG. 15, portions of the fluid circuits 156, 158, 160 are shown shaded according to exemplary depths. In the illustrated embodiment, shaded region 181, which includes the feed circuit and also an upstream portion of the heat exchange circuit 158, has a shallower depth (e.g., 0.090 in. deep) to adapt to the thinner region of the heat exchanger body 146. At shaded region 183, which includes a downstream portion of the heat exchange circuit 158, the depth is increased (e.g., 0.140 inch deep) to correspond to the increased thickness of the heat exchanger body 146. At shaded region 184, which includes the discharge circuit 160 in the illustrated embodiment, the depth of the fluid circuit is even further increased (0.180 inch).

It is of course understood that an exemplary heat exchanger according to the above could take other shapes or forms, including a non-OGV type heat exchanger having a flat form or more contoured form than that shown, while still utilizing the optimization of the internal flow passages described herein.

Turning to FIGS. 16-21, another aspect according to the present disclosure will now be described with exemplary reference to the embodiment of the OGV-type heat exchanger 144. As described above, an outlet guide vane (OGV) 40 is a structural component of the aircraft engine which structurally connects the fan casing 26 and the central hub 21 and withstands large aerodynamic forces. As such, the material (or combination of materials) selected for the OGV 40 generally include higher-strength metals (or metal alloys), particularly light-weight aluminum alloys, such as Al 2219.

As is apparent from the foregoing description, the exemplary OGV-type heat exchanger 144 also is a functional heat exchange component of the system in which the structures (e.g., 167) forming the fluid passages (e.g., heat exchange passages 159) and the external surfaces (e.g., plates or walls 155) provide heat exchange relationship of the internal fluid with the external environment. Thus, one or more of these structures are made of higher thermal conductivity materials, particularly light-weight aluminum alloy, such as Al 6061. Such high thermal conductivity material (e.g., Al 6061), however, is of relatively lower strength compared to the high-strength material (e.g., Al 2219). Moreover, higher strength materials, such as Al 2219, present challenges for welding, brazing and diffusion bonding due to reasons such as low melting points and corrosion issues resulting from joining processes. Accordingly, in exemplary embodiments, the OGV-type heat exchanger 144 is a multi-material heat exchanger 144 that integrates structural components and heat transfer components into a single heat exchanger.

According to an aspect, the exemplary multi-material heat exchanger 144 includes one or more heat exchange sections (shown at shaded region 186) formed from a first material, and one or more structural sections (shown at sections 187 and 188) formed from a second material, in which the second material has a higher strength (i.e., ultimate tensile strength) than the first material. The one or more heat exchange sections 186 and the one or more structural sections 187, 188 are coupled to one another in such a way that a single integrated heat exchanger is formed.

The one or more heat exchange sections 186 may be formed in any suitable configuration as desired to provide heat exchange performance of the device. In the illustrated embodiment, the heat exchange sections 186 are formed in accordance with the OGV-type heat exchanger 144 described above in connection with FIGS. 8-13, including at least part of the feed fluid circuit 156, the heat exchange fluid circuit 158, and at least part of the discharge fluid circuit 160.

The one or more structural sections 187, 188 may be formed in any suitable configuration as desired to provide structural performance of the device. In the illustrated embodiment, the structural sections 187, 188 essentially frame, or bound, the heat exchange section(s) 186. As shown, the structural sections 187, 188 are provided on opposite sides of the OGV to form at least the leading edge 147a and trailing edge 147b of the OGV-type heat exchanger 144, which may be an airfoil-type structure as described above. The OGV-type heat exchanger includes the root 172 that connects the OGV to the outer diameter of the central hub 21 of the fan module, and the tip 174 that connects the OGV-type heat exchanger 144 to the inner diameter of the fan casing 26, as described above. The structural sections 187, 188 span across the device to bridge the root 172 and tip 174 to structurally connect the fan casing 26 to the central hub and withstand the large aerodynamic forces exerted against the OGV-type heat exchanger 144. In exemplary embodiments, the flanges forming the root 172 and tip 174 also are made of the same material as the structural sections 187, 188 forming the leading and trailing edge.

In the illustrated embodiment, the outer surface (e.g., plate 155) overlying the heat exchanger section(s) 186 is shown in transparent view to show the location of the heat exchanger section(s) 186 relative to the structural section(s) 187, 188. In some embodiments, the outer surfaces overlying the heat exchange section(s) (e.g., plate(s) 155) are made of the same material that forms the fin structures and fluid passages of the one or more fluid circuits 156, 158, 160 in the shaded heat exchange section(s) 186. For example, in the illustrated embodiment, the plates of the heat exchanger core are made of Al 6061 for high thermal conductivity and bondability. In this manner, the structural sections 187, 188 frame or bound portions of the heat exchange sections 186 to provide the desired structural integrity of the integrated heat exchanger. In alternative embodiments, the outer surfaces (e.g., plate(s) 155) covering the heat exchange sections 186 may be made of the same material that forms the structural sections 187, 188. In this manner, the heat exchange section(s) 186 form a core within a structural shell.

The heat exchange section(s) 186 and structural section(s) 187, 188 may be made of any suitable material or combination of materials as desired for the particular application. In exemplary embodiments, the material of the heat exchange section(s) 186 is joinable with the material of the structural section(s) 187, 188, such as by brazing, welding, diffusion bonding, or another suitable method of joining. Some exemplary materials of the heat exchanger section(s) 186 include one or more of: 1XXX, 3XXX, or 6XXX series aluminum alloy. Exemplary materials of the structural section(s) 187, 188 include one or more of: 2XXX, 7XXX, or 8XXX series aluminum alloys. In a specific, non-limiting embodiment, the structural section(s) 187, 188 are formed with Al 2219, and the heat exchange section(s) 186 are formed with Al 6061, which these two materials are joinable via welding or diffusion bonding. This embodiment would allow for the exemplary heat exchanger 144 to be integrated into the existing structure of a gas turbine engine, saving system weight, space claim and improving engine efficiency through reducing SFC by lowering the net drag through the elimination of surface coolers.

Turning to FIGS. 17-21, an exemplary method of fabricating the multi-material OGV-type heat exchanger 144 is shown. In FIGS. 17-21, the section overlying the heat exchanger section(s) 186 (e.g., the outer plate 155) is shown in transparent view for showing the location of the heat exchanger section(s) 186 relative to the structural section(s) 187, 188.

Figure 17:
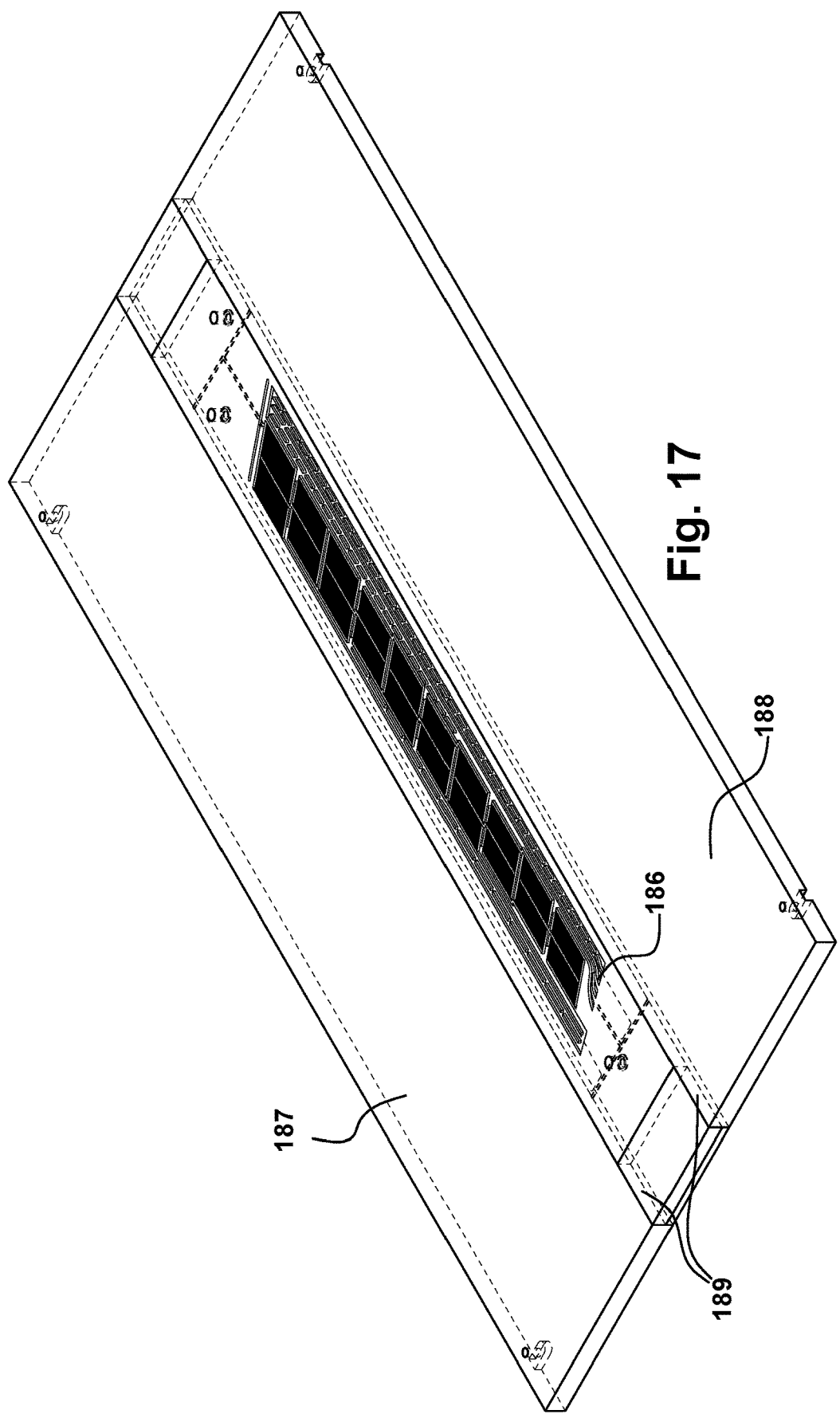
FIGS. 17-21 show method steps in the fabrication of the heat exchanger in FIG. 16.

FIG. 17 shows the integrated multi-material heat exchanger 144 assembly prior to forming it to more closely fit the shape of the OGV 40. In exemplary embodiments, the heat exchanger section(s) 186 can be coupled to the structural section(s) 187, 188 by friction stir weld joints 189. The friction stir welding process may provide joining efficiency by maintaining the mechanical properties of the base metal at a high level (e.g., maintain the ultimate tensile strength property to at least 90%), whereas other welding processes may create a heat affected zone with lower strength. The friction stir welding process also may provide limited distortion of the OGV structure. The absence of a filler material also may improve corrosion resistance of the base material.

Figure 18:
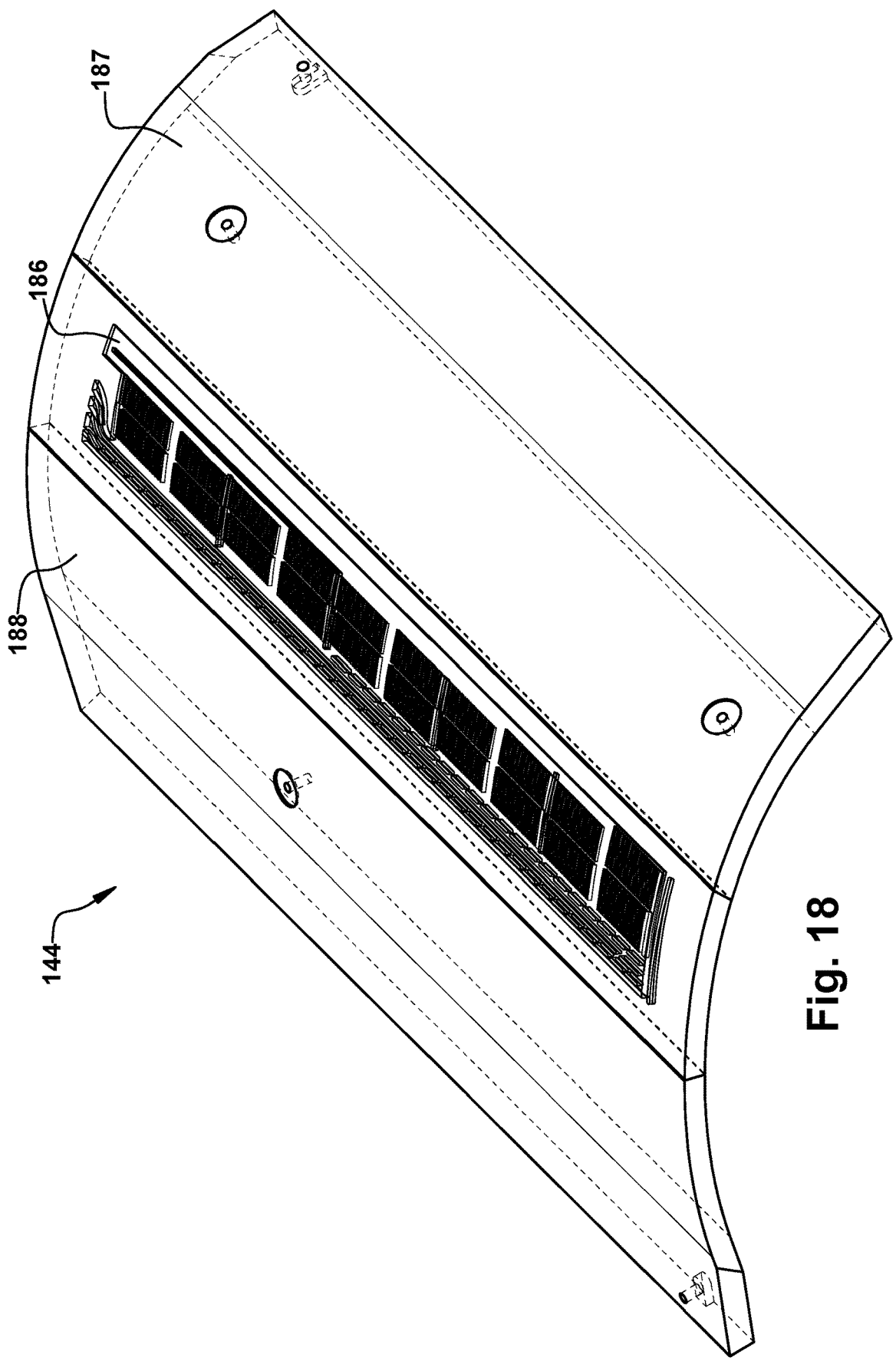

FIG. 18 shows the integrated heat exchanger assembly 144 after forming it into a curved or contoured shape. This process could be achieved by suitable bending techniques such as press brake or roll forming.

Figure 19:
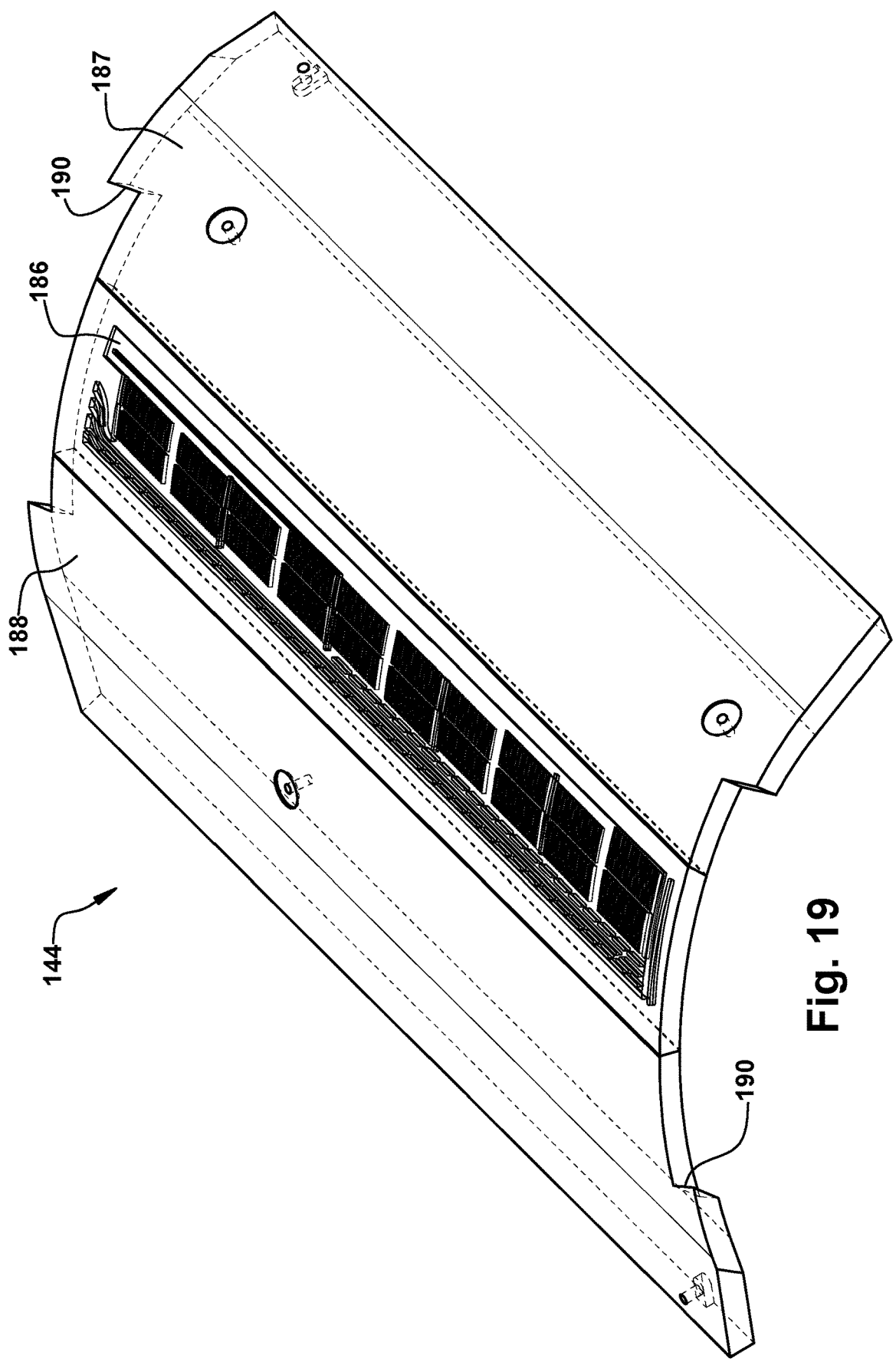

FIG. 19 shows the integrated heat exchanger assembly 144 with machined socket interfaces 190. The sockets 190 are machined to accept the tip flange 174 and root flange 172 of the device.

Figure 20:
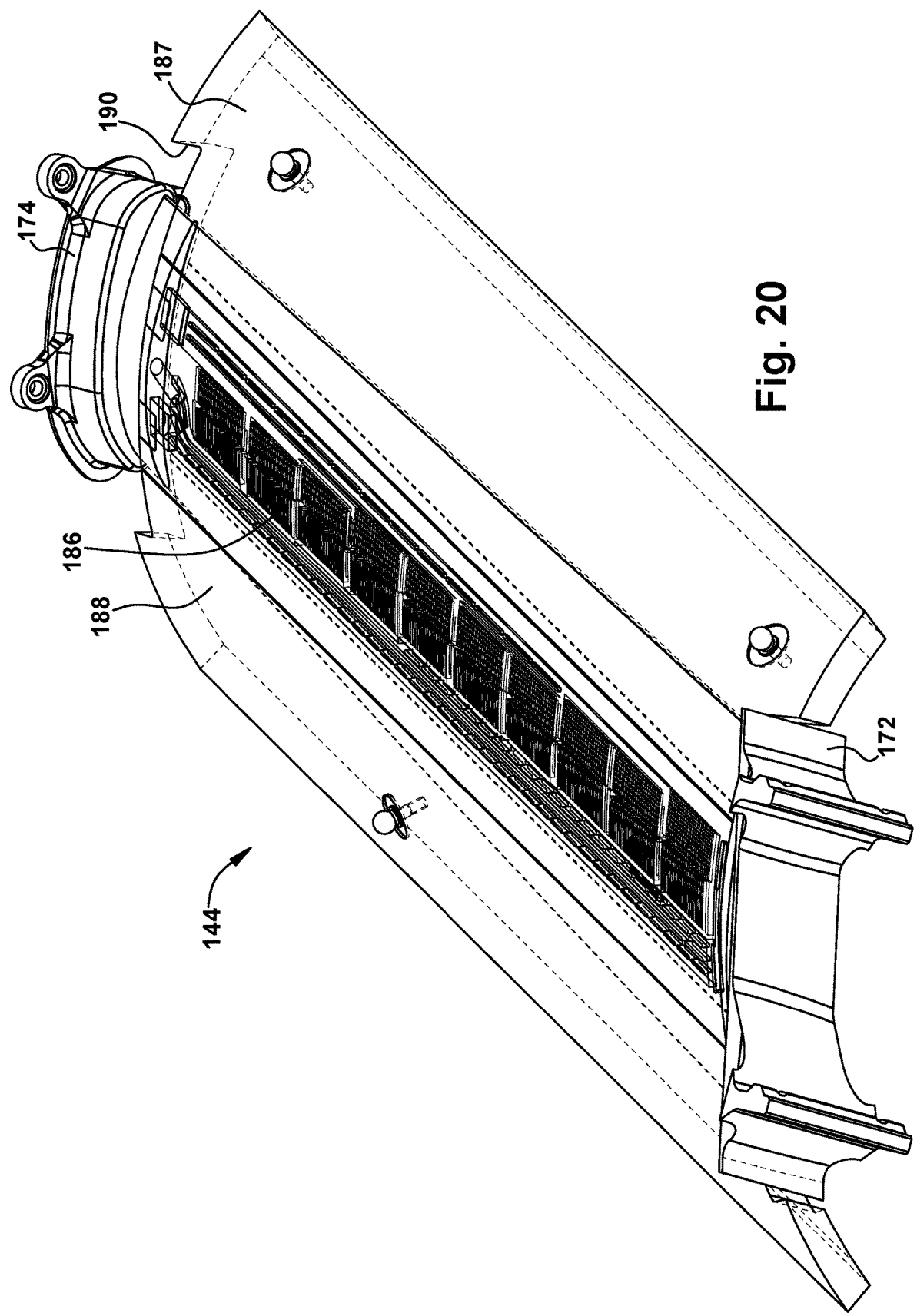

FIG. 20 shows the integrated heat exchanger assembly 144 with the tip and root flanges 174, 172 attached to the tip and root sockets 190. As shown, the tip 174 may include the inlet and outlet ports 148, 149 (shown in FIG. 16) for fluidly connecting the heat exchanger 144 to the aircraft fluid system (e.g., lubricant system), as described above. The root 172 and tip 174 can be coupled via any suitable technique, such as with friction stir weld joints.

Figure 21:
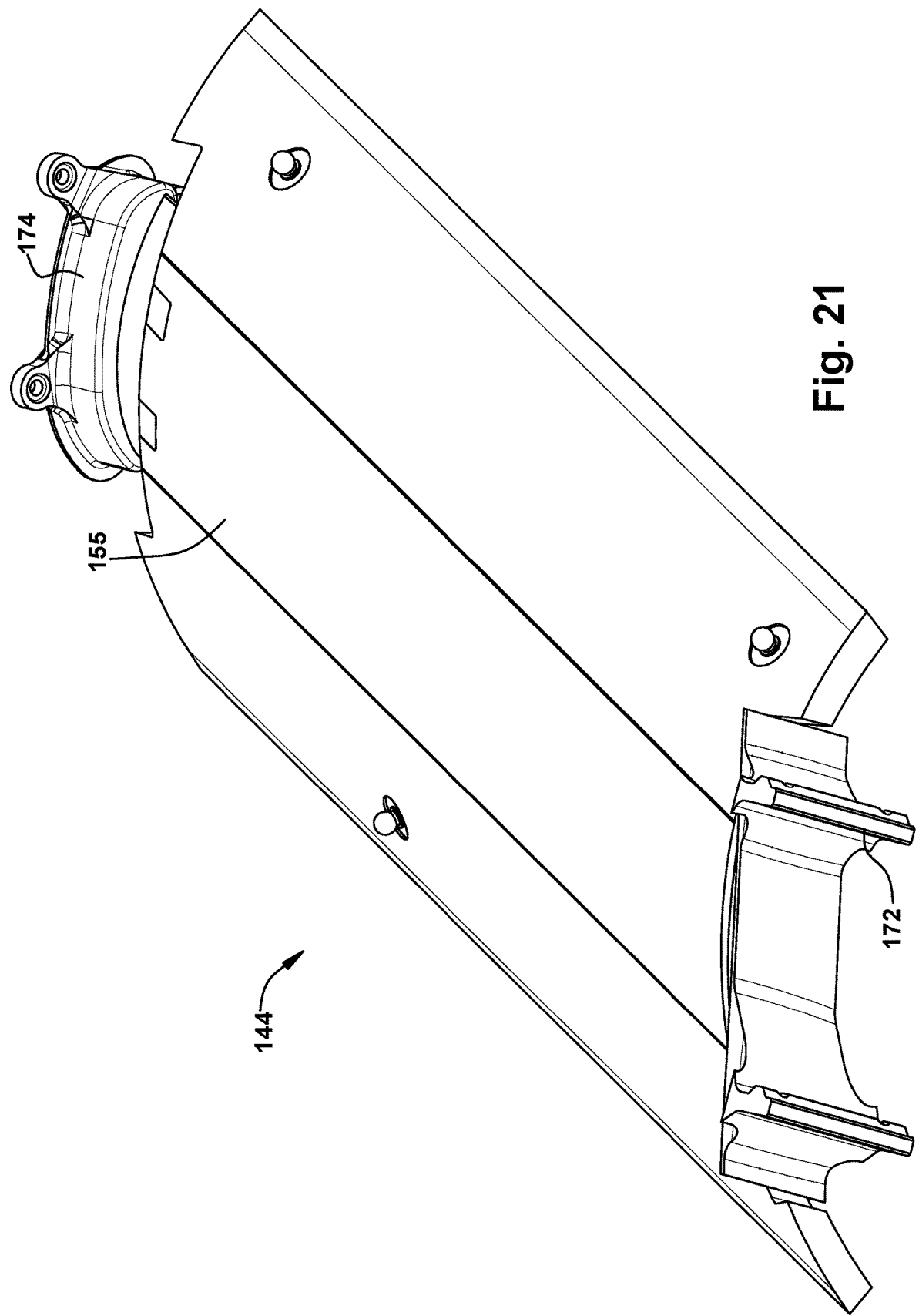

FIG. 21 shows the heat exchanger assembly 144 prior to final machining. After final machining, the leading and/or trailing edges are thinned, as described above and shown in FIG. 14.

The exemplary OGV structure 40 may provide an ideal load bearing structure in an aircraft system to incorporate a heat exchanger according to the above, as it offers a very large air-washed surface area for heat rejection. In concert with the inherent strength of advanced bonding techniques, the configuration can replace existing load bearing structures creating a multi-function device, integrating structural capability and heat exchange capability. Benefits of this design include: (i) improved specific fuel consumption due to reduced drag from the ability to eliminate air fins which are necessary for a surface cooler, (ii) lower system weight achieved by the elimination of surface coolers, and (iii) smaller system space claim achieved by combining the heat exchanger into the FOGV. In the specific example of a structural OGV heat exchanger, utilizing solid-state or fusion welding processes that join materials of differing mechanical and thermal characteristics provides the capability to fabricate a multi-material heat exchanger device that integrates the functions of structural component and heat transfer device into one element.

While exemplary forms of the heat exchanger 44, 144 have been described above, it should be apparent to those having ordinary skill in the art that alternative configurations also could be employed. For example, although the exemplary structural heat exchanger is shown and described as an OGV in some embodiments, it should be appreciated that the same process can be employed to create other structural members with an integrated heat exchanger or other functional element. The materials of the heat exchanger can be aluminum or aluminum alloys that can be formed into complex geometries and the heat exchanger can be coupled to a structural member that has dissimilar materials, and which may be made from a high strength structural material (e.g., titanium, composite, or another material(s).

More generally, according to an aspect, the present disclosure provides a structural fluid transfer apparatus, including: a first material that forms one or more fluid flow passages through the apparatus; a second material that forms one or more structural members configured to distribute a majority of load across the apparatus, wherein the second material has a higher strength than the first material; and wherein the first material and the second material are coupled to one another to form a single integrated apparatus having functions of a structural component and a fluid transfer device.

The structural fluid transfer apparatus may be the heat exchanger 144 in which the one or more fluid flow passages are formed by the heat exchange section(s) 186 and the structural members are formed by the structural section(s) 187, 188. It is understood, however, that such a structural fluid transfer apparatus may be another suitable form of heat exchanger; or the structural fluid transfer apparatus may be another type of fluid transfer apparatus that does not provide significant heat transfer functionality at all.

One exemplary design criteria for such a structural fluid transfer apparatus may be that the section forming the fluid flow passages with the first material is a material that is bondable (e.g., welding, diffusion joining, friction stir welding, brazing, or the like). In exemplary embodiments, the bondability of the material is dictated by diffusion-type joining processes and not brazing processes. This may be particularly beneficial with fluid transfer apparatus having small flow passages (described in further detail below), where brazing or similar processes may block the small passages. In such a bonding design criteria, the melting point of the material is a factor.

An additional or alternative exemplary design criteria for such a structural fluid transfer apparatus is the size of the fluid flow passages formed by the first material. In exemplary embodiments, the size of the fluid flow passages may be less than about 2 mm (such as in a range from 0.1 mm to 2 mm, or about 1.5 mm or less). The exemplary heat exchanger 144 described above has such small fluid flow passages, and thus also utilizes a bondable material without brazing techniques, as described above. Other examples of fluid transfer apparatus having small flow passages includes distribution manifolds, flow control devices (valves), or fluid injectors.

An additional or alternative exemplary design criteria for such a structural fluid transfer apparatus may be that the section forming the fluid flow passages with the first material is a material having a high thermal conductivity. In exemplary embodiments, the thermal conductivity of the first material forming the fluid flow passages is in a range from 1100-1220 BTU-in/hr-ft$^2$-° F. Non-limiting examples of such a first material includes: copper, aluminum nitride, graphite; or combinations thereof. Such a high thermal conductivity design criteria may be used for heat exchangers (such as heat exchanger 144.

Another exemplary design criteria for the structural fluid transfer apparatus is that the structural members formed by the second material is made with a high strength material. The strength criteria may be in the form of tensile strength. In exemplary embodiments, the tensile strength of the second material forming the structural members is in a range from 61-67 ksi. Alternatively or additionally, the strength criteria may be based on increasing the strength over the first material that forms the fluid flow passages. The exemplary heat exchanger 144 includes such a high-strength criteria for the structural sections 187, 188.

An additional or alternative exemplary design criteria for such a structural fluid transfer apparatus may be that the structural members have high strength at high temperature operating conditions. In exemplary embodiments, the maximum operating condition is 160 degrees Celsius; and within this range the tensile strength of the second material forming the structural members is in a range from 44 to 50 ksi. Such a high-strength at elevated temperature design criteria may be used for heat exchangers (such as heat exchanger 144).

Exemplary fluid transfer devices such as heat exchangers have been described herein. In exemplary embodiments, the heat exchanger includes a fluid circuit in which an incoming fluid stream is progressively divided into multiple smaller streams, each of which delivers the heat exchange fluid into one or more heat exchange sections of the device; and/or in which multiple fluid streams of the fluid circuit are discharged from one or more heat exchanger sections, each of which are progressively combined into one or more larger streams before exiting the device. The heat exchanger may have a thin body portion and a thick body portion and may adapt a depth of the fluid circuit to the changes in thickness of the heat exchanger body. The heat exchanger or other fluid transfer device may form a structural component and may integrate multiple materials to provide fluid flow functionality (and optionally heat exchange functionality) along with structural functionality into a single device.

According to an aspect, a heat exchanger includes: a feed fluid circuit including a plurality of feed fluid passages; a heat exchange fluid circuit including a plurality of heat exchange fluid passages that are configured to provide a heat exchange relationship for the heat exchanger, the plurality of heat exchange fluid passages being fluidly connected to the feed fluid circuit in a downstream direction of the heat exchanger; and a discharge fluid circuit including a plurality of discharge fluid passages that are fluidly connected to the heat exchange fluid circuit in the downstream direction; wherein the feed fluid circuit includes at least a first feed section having a first set of the plurality of feed fluid passages, and a second feed section having a second set of the plurality of feed fluid passages, the second feed section being located downstream of the first feed section, and wherein each of the second set of the plurality of feed fluid passages is progressively smaller than each of the first set of feed fluid passages, as measured by cross-sectional area transverse to a direction of downstream fluid flow through the passages, such that fluid from at least the first feed section to the second feed section is divided into progressively smaller flow paths in the downstream direction.

Exemplary embodiments may include one or more of the following additional features, separately or in any combination.

In exemplary embodiment(s), the discharge fluid circuit includes at least a first discharge section having a first set of the plurality of discharge fluid passages, and a second discharge section having a second set of the plurality of discharge fluid passages, the second discharge section being located downstream of the first discharge section.

In exemplary embodiment(s), each of the second set of the plurality of discharge fluid passages is progressively larger than each of the first set of discharge fluid passages, as measured by cross-sectional area transverse to a direction of downstream fluid flow through the passages, such that fluid from at least the first discharge section to the second discharge section is combined into progressively larger flow paths in the downstream direction.

In exemplary embodiment(s), the heat exchange fluid circuit includes at least a set of the plurality of heat exchange fluid passages that are smaller than an adjacent set of the plurality of feed fluid passages to progressively divide flow in the downstream direction from the feed fluid circuit into the heat exchange fluid circuit.

In exemplary embodiment(s), the heat exchange fluid circuit includes at least a set of the plurality of heat exchange fluid passages that are smaller than an adjacent set of the plurality of discharge fluid passages to progressively combine flow in the downstream direction from the heat exchange fluid circuit to the discharge fluid circuit.

In exemplary embodiment(s), the feed fluid circuit includes at least a third feed section having a third set of the plurality of feed fluid passages, the third feed section being located downstream of the second feed section, wherein each of the third set of the plurality of feed fluid passages is progressively smaller than each of the second set of feed fluid passages, as measured by cross-sectional area transverse to a direction of downstream fluid flow through the passages, such that fluid from at least the second feed section to the third feed section is divided into progressively smaller flow paths in the downstream direction.

In exemplary embodiment(s), the discharge fluid circuit includes at least a first discharge section having a first set of the plurality of discharge fluid passages, a second discharge section having a second set of the plurality of discharge fluid passages, and a third discharge section having a third set of the plurality of discharge fluid passages, the second discharge section being located downstream of the first discharge section, and the third discharge section being located downstream of the second discharge section, and wherein each of the second set of the plurality of discharge fluid passages is progressively larger than each of the first set of discharge fluid passages and each of the third set of the plurality of discharge fluid passages is progressively larger than each of the second set of discharge fluid passages, as measured by cross-sectional area transverse to a direction of downstream fluid flow through the passages, such that fluid from at least the first discharge section to the second discharge section to the third discharge section is combined into progressively larger flow paths in the downstream direction.

In exemplary embodiment(s), the progressively smaller size of first, second and third set of the plurality of feed fluid passages in the downstream direction are recursively smaller in size.

In exemplary embodiment(s), the progressively larger size of first, second and third set of the plurality of discharge fluid passages in the downstream direction are recursively larger in size.

In exemplary embodiment(s), the discharge fluid circuit is configured as a mirror image to the feed fluid circuit about an axis that is parallel to both the feed and discharge fluid circuits.

In exemplary embodiment(s), the heat exchange fluid circuit constitutes a majority compared to the feed and discharge fluid circuits.

In exemplary embodiment(s), the plurality of heat exchange fluid passages are constant throughout the heat exchange fluid circuit in the downstream direction.

In exemplary embodiment(s), the heat exchanger is a plate-fin heat exchanger.

In exemplary embodiment(s), the plurality of feed fluid passages, heat exchange fluid passages, and discharge fluid passages are formed between fin structures that are arranged in an array of rows and columns.

In exemplary embodiment(s), the fin structures are formed as rectangular fins.

According to an aspect, an aircraft component comprising the heat exchanger according to any of the foregoing is provided, wherein the aircraft component is an engine component, an outlet guide vane, or a surface air cooled oil cooler.

According to an aspect, a heat exchanger includes: a heat exchanger body including a thin heat exchange section and a thick heat exchange section that is thicker in transverse cross-section than the thin heat exchange section, the heat exchanger body including a plurality of fluid flow paths configured to provide heat exchange relationship for the heat exchanger, the plurality of fluid flow paths extending from the thick heat exchange section to the thin heat exchange section, wherein a depth of the plurality of flow paths is adapted to the thickness of the heat exchanger body, such that the plurality of fluid flow paths in the thick section are deeper than the plurality of fluid flow paths in the thin section.

Exemplary embodiments may include one or more of the following additional features, separately or in any combination.

In exemplary embodiment(s), the heat exchanger includes a feed fluid circuit, a heat exchange fluid circuit, and a discharge fluid circuit that are fluidly connected to each other across the thick and thin heat exchange sections, and respective depths of one or more of the feed, heat exchange and discharge circuits are adapted to the thickness of the heat exchanger body.

In exemplary embodiment(s), at least a portion of the feed fluid section is located at the thin heat exchange section of the body, and wherein at least a portion of the heat exchange fluid section is located at the thick heat exchange section of the body.

In exemplary embodiment(s), the heat exchanger includes any of the foregoing.

According to an aspect, an aircraft component includes the heat exchanger according to any of the foregoing, wherein the aircraft component is an outlet guide vane having an airfoil shape.

According to an aspect, a multi-material heat exchanger, includes: one or more heat exchange sections formed from a first material; one or more structural sections formed from a second material, wherein the second material has a higher strength than the first material; wherein the one or more heat exchange sections and the one or more structural sections are coupled to one another to form a single integrated heat exchanger having functions of a structural component and a heat transfer device.

In exemplary embodiment(s), the one or more structural sections border the one or more heat exchange sections, or wherein the one or more heat exchange sections form a core enclosed within a shell provided by the one or more structural sections.

In exemplary embodiment(s), the first material has a higher thermal conductivity than the second material.

In exemplary embodiment(s), the second material is 2XXX, 7XXX, or 8XXX-series aluminum alloy, and wherein the first material is 1XXX, 3XXX, or 6XXX-series aluminum alloy.

In exemplary embodiment(s), the heat exchanger includes any of the foregoing.

According to another aspect, a structural fluid transfer apparatus, includes: a first material that forms one or more fluid flow passages through the apparatus; a second material that forms one or more structural members configured to distribute load across the apparatus, wherein the second material has a higher strength than the first material; and wherein the first material and the second material are coupled to one another to form a single integrated apparatus having functions of a structural component and a fluid transfer device.

Exemplary embodiments may include any of the foregoing features, separately or in any combination.

According to an aspect, the heat exchanger may have one or more inlet and outlet channels where flow into and/or out of each section is controlled by single or multiple flow-control orifices. The orifices feed fluid into/from a manifold plenum with ribs and or pin-fins that distribute flow into one or more heat exchange sections. Each heat exchange section may itself form a diverging (increasing number of sections) or converging (decreasing number of sections) hierarchy of manifold and heat exchange sections, where each section acts to distribute fluid to downstream sections or collect fluid from upstream sections in an optimal way according to performance measures and constraints. The hierarchy of sections can be (a) a tree-like configuration (inlet passages branch into smaller and smaller passages to feed a collection of heat exchange regions, or combine flow from heat exchange sections into larger and larger discharge passages), (b) a recursive configuration (where heat exchange sections recursively discharge into sections characterized by smaller and smaller geometric features or flow passages, or recursively combine to discharge into sections with larger and larger geometric features and flow passages), and/or (c) a serial configuration where each section is characterized recursively refined or coarsened geometric length scales that optimize heat transfer characteristics along the flow path (e.g. recursively combined channels where the channel widths/heights are appropriate for the flow in the channels).

Embodiments may include one or more of the following additional features, separately or in any combination.

For example, additional features can include one or more of the following: (1) General design that divides inlet flow into multiple streams, each of which flows through a heat exchange section specifically configured for the flow stream, (2) Multiple heat exchange sections, (3) Multiple inlet channels feeding one or more heat exchange sections, (4) Multiple outflow channels gathering flow from one the one or more heat exchange sections, (5) Each section uses a single-pass counter flow, single-pass parallel flow, single-pass crossflow or multi-pass configuration, or a combination of such configurations, (6) Each section can use channels (e.g., micro or mini, etc.), round, or shaped fin structures in regular array arrangements, staggered array arrangements, with regular size and spacing, random size and spacing, or special pattern size and spacing as required for flow control or optimal heat change as chosen by designer or achieved by manual or automatic optimization, (7) Bypass valve incorporated into the heat exchanger, where the bypass valve directs flow into exit channels and/or the heat exchange section of the heat exchanger According to another aspect, a method and apparatus for manufacturing a complex, multifunctional structure includes utilizing a readily fabricated or joinable material to make a functional element, for example a heat exchanger, then using a suitable joining method to join the functional element to a structural element made from a material that has more limited joining material properties. The exemplary method of manufacture provides for the integration of the functional element, for example, heat transfer, and the structural element which bears mechanical load. The functional element of the device can be produced by many fabrication methods including brazing, diffusion bonding (welding) or additive manufacturing. Joining the functional element to the structural element can be done by a fusion joining process or a solid-state process, such as friction stir welding. The joining process should be suitable for the structural material and appropriate for the joining of dissimilar materials.

As used herein, an "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operatively connected entities. An operative connection or coupling may include the entities being integral and unitary with each other.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A heat exchanger for cooling an operating fluid flowing within and through the heat exchanger, comprising:
    a feed fluid circuit including a plurality of feed fluid passages to transport an operating fluid;
    a heat exchange fluid circuit including a plurality of heat exchange regions that are configured to provide a heat exchange relationship for the heat exchanger, the plurality of heat exchange feed fluid passages being fluidly connected to the feed fluid circuit in a downstream direction of the heat exchanger, the plurality of heat exchange feed fluid passages arranged to provide apportioning of the operating fluid for optimization of heat exchange; and
    a discharge fluid circuit including a plurality of discharge fluid passages that are fluidly connected to the heat exchange fluid circuit in the downstream direction;
    wherein the feed fluid circuit includes at least a first feed section having a first set of the plurality of feed fluid passages, and a second feed section having a second set of the plurality of feed fluid passages, the second feed section being located downstream of the first feed section, and
    wherein each of the second set of the plurality of feed fluid passages is progressively smaller than each of the first set of feed fluid passages, as measured by cross-sectional area transverse to a direction of downstream operating fluid flow through the passages, such that operating fluid from at least the first feed section to the second feed section is divided into progressively smaller flow paths in the downstream direction;

wherein the heat exchanger comprises an air-cooled oil cooler configured to cool the operating fluid;

wherein each of the plurality of heat exchange regions are configured as a single-pass heat transfer circuit for a local counter-flow configuration, parallel-flow configuration, or crossflow heat exchange configuration relative to an external air flow of the air-cooled oil cooler, or multi-pass heat transfer circuit for a locally mixed-flow heat exchange configuration relative to the external air flow of the air-cooled oil cooler;

wherein the heat exchange fluid circuit, to optimize heat transfer performance across all the heat exchange regions, includes at least a plurality of dividing flow-control features that recursively divide the operating fluid flow distributing the operating fluid in the downstream direction into the heat exchange regions, and the heat exchange fluid circuit further includes at least a plurality of combining flow-control features that recursively combine the exiting fluid flow in the downstream direction from the heat exchange feed sections to collect and discharge the operating fluid;

wherein the plurality of heat exchange regions are configured to apportion the flow rate of the operating fluid for balancing heat transfer performance and control pressure loss through the heat exchanger;

wherein the heat exchange feed sections comprise a tree-like configuration, a fractal-like configuration, or a serial configuration where each feed section utilizes recursively refined or coarsened geometric length scales which augment heat transfer along the progressively smaller flow paths of the second feed section; and wherein a width and height of the heat exchange regions apportion the flow in the heat exchange regions.

2. The heat exchanger according to claim 1,
wherein the discharge fluid circuit includes at least a first discharge section having a first set of the plurality of discharge fluid passages, and a second discharge section having a second set of the plurality of discharge fluid passages, the second discharge section being located downstream of the first discharge section, and wherein each of the second set of the plurality of discharge fluid passages is progressively larger than each of the first set of discharge fluid passages, as measured by cross-sectional area transverse to a direction of downstream operating fluid flow through the passages, such that operating fluid from at least the first discharge section to the second discharge section is combined into progressively larger flow paths in the downstream direction.

3. The heat exchanger according to claim 1,
wherein the heat exchange fluid circuit includes at least a set of the plurality of heat exchange fluid passages that are smaller than an adjacent set of the plurality of feed fluid passages to progressively divide flow in the downstream direction from the feed fluid circuit into the heat exchange fluid circuit.

4. The heat exchanger according to claim 1,
wherein the heat exchange fluid circuit includes at least a set of the plurality of heat exchange fluid passages that are smaller than an adjacent set of the plurality of discharge fluid passages to progressively combine flow in the downstream direction from the heat exchange fluid circuit to the discharge fluid circuit.

5. The heat exchanger according to claim 1,
wherein the feed fluid circuit includes at least a third feed section having a third set of the plurality of feed fluid passages, the third feed section being located downstream of the second feed section, wherein each of the third set of the plurality of feed fluid passages is progressively smaller than each of the second set of feed fluid passages, as measured by cross-sectional area transverse to a direction of downstream fluid flow through the passages, such that operating fluid flow from at least the second feed section to the third feed section is divided into progressively smaller flow paths in the downstream direction, and wherein the discharge fluid circuit includes at least a first discharge section having a first set of the plurality of discharge fluid passages, a second discharge section having a second set of the plurality of discharge fluid passages, and a third discharge section having a third set of the plurality of discharge fluid passages, the second discharge section being located downstream of the first discharge section, and the third discharge section being located downstream of the second discharge section, and wherein each of the second set of the plurality of discharge fluid passages is progressively larger than each of the first set of discharge fluid passages and each of the third set of the plurality of discharge fluid passages is progressively larger than each of the second set of discharge fluid passages, as measured by cross-sectional area transverse to a direction of downstream operating fluid flow through the passages, such that fluid from at least the first discharge section to the second discharge section to the third discharge section is combined into progressively larger flow paths in the downstream direction.

6. The heat exchanger according to claim 5,
wherein the progressively smaller size of first, second and third set of the plurality of feed fluid passages in the downstream direction are recursively smaller in size, and wherein the progressively larger size of first, second and third set of the plurality of discharge fluid passages in the downstream direction are recursively larger in size.

7. The heat exchanger according to claim 1,
wherein the discharge fluid circuit is configured as a mirror image to the feed fluid circuit about an axis that is parallel to both the feed and discharge fluid circuits.

8. The heat exchanger according to claim 1,
wherein the heat exchanger is a plate-fin heat exchanger.

9. The heat exchanger according to claim 8,
wherein the plurality of feed fluid passages, heat exchange fluid passages, and discharge fluid passages are formed between fin structures that are arranged in an array of rows and columns.

10. The heat exchanger according to claim 9,
wherein the fin structures are formed as rectangular fins; and/or wherein the fins are transverse, aligned or angled relative to the general flow direction.

11. An aircraft component comprising the heat exchanger according to claim 1, wherein the aircraft component is an engine component, an outlet guide vane, or a surface air cooled oil cooler.

12. The heat exchanger of claim 1 further comprising:
a heat exchanger body including a thin heat exchange section and a thick heat exchange section that is thicker in transverse cross-section than the thin heat exchange section;

wherein the plurality of fluid flow paths extending from the thick heat exchange section to the thin heat exchange section,
wherein a depth of the plurality of flow paths is adapted to the thickness of the heat exchanger body, such that the plurality of fluid flow paths in the thick section are deeper than the plurality of fluid flow paths in the thin section.

13. The heat exchanger according to claim 12, wherein the feed fluid circuit, the heat exchange fluid circuit, and the discharge fluid circuit are fluidly connected to each other across the thick and thin heat exchange sections, and respective depths of one or more of the feed, heat exchange and discharge circuits are adapted to the thickness of the heat exchanger body.

14. The heat exchanger according to claim 13,
wherein at least a portion of the feed fluid section is located at the thin heat exchange section of the body, and wherein at least a portion of the heat exchange fluid section is located at the thick heat exchange section of the body.

15. The heat exchanger of claim 1, further comprising a heat exchanger body including a thin heat exchange section and a thick heat exchange section that is thicker in transverse cross-section than the thin heat exchange section;
wherein at least a portion of the first feed sections and second feed section are located at the thin heat exchange section of the body;
wherein at least a portion of the heat exchange regions are located at the thick heat exchange section of the body to conform an operating fluid flow configuration to the external form of the heat exchanger; and
wherein the heat exchanger is an aircraft component in the form of an outlet guide vane having an airfoil shape.

* * * * *